US008873523B2

(12) United States Patent
Bradley et al.

(10) Patent No.: US 8,873,523 B2
(45) Date of Patent: Oct. 28, 2014

(54) METHODS AND APPARATUS FOR SOLICITED ACTIVATION FOR PROTECTED WIRELESS NETWORKING

(75) Inventors: Robert Bradley, Foster City, CA (US); Christopher B. Zimmermann, San Jose, CA (US); Philip Kearney, San Jose, CA (US)

(73) Assignee: Apple Inc., Cupertino, CA (US)

( * ) Notice: Subject to any disclaimer, the term of this patent is extended or adjusted under 35 U.S.C. 154(b) by 576 days.

(21) Appl. No.: 12/571,102

(22) Filed: Sep. 30, 2009

(65) Prior Publication Data

US 2011/0075589 A1 Mar. 31, 2011

(51) Int. Cl.
*H04W 4/00* (2009.01)
*H04W 48/16* (2009.01)

(52) U.S. Cl.
CPC .................................. *H04W 48/16* (2013.01)
USPC ............ 370/338; 370/331; 370/328; 370/308

(58) Field of Classification Search
USPC .................................. 370/254, 329, 331, 338
See application file for complete search history.

(56) References Cited

U.S. PATENT DOCUMENTS

| 6,434,113 | B1 | 8/2002 | Gubbi | |
|---|---|---|---|---|
| 6,463,473 | B1 | 10/2002 | Gubbi | |
| 6,928,295 | B2 | 8/2005 | Olson et al. | |
| 6,934,752 | B1 | 8/2005 | Gubbi | |
| 7,110,374 | B2 * | 9/2006 | Malhotra et al. | 370/329 |
| 7,254,708 | B2 | 8/2007 | Silvester | |
| 7,274,684 | B2 | 9/2007 | Young et al. | |
| 7,295,521 | B2 * | 11/2007 | Choi et al. | 370/238 |
| 7,466,678 | B2 * | 12/2008 | Cromer et al. | 370/331 |
| 7,493,368 | B2 | 2/2009 | Raverdy et al. | |
| 7,508,801 | B1 * | 3/2009 | Calhoun et al. | 370/338 |
| 7,522,549 | B2 | 4/2009 | Karaoguz et al. | |
| 7,577,125 | B2 | 8/2009 | Abhishek et al. | |
| 7,603,557 | B2 | 10/2009 | Zhang et al. | |
| 7,634,249 | B2 | 12/2009 | Hahn et al. | |
| 7,646,872 | B2 * | 1/2010 | Brown et al. | 380/277 |
| 7,706,345 | B2 * | 4/2010 | Meier et al. | 370/338 |

(Continued)

FOREIGN PATENT DOCUMENTS

| EP | 1950987 A1 | 7/2008 |
|---|---|---|
| EP | 1983778 A1 | 10/2008 |

(Continued)

OTHER PUBLICATIONS

Bradley, "Methods and Apparatus for Solicited Activation for Protected Wireless Networking," U.S. Appl. No. 12/873,263, filed Aug. 31, 2010. (copy available via PAIR).

(Continued)

*Primary Examiner* — Brian O'Connor
(74) *Attorney, Agent, or Firm* — Park, Vaughan, Fleming & Dowler LLP

(57) ABSTRACT

Methods and apparatus that enable solicited access to a secure wireless network having complex security protocols. In one embodiment, such solicited access is performed using a streamlined or reduced number of steps and includes an exemplary active/passive scanning protocol and use of an optimized service discovery protocol (SDP). Furthermore, multiple aspects of the invention are directed to improving and enhancing user experience, including a reduction of "human" interaction requirements for secure network operation (such as changing settings, entering addresses, etc.), and furthermore, integrated utilization of human readable text.

22 Claims, 17 Drawing Sheets

(56) References Cited

U.S. PATENT DOCUMENTS

| | | | |
|---|---|---|---|
| 7,715,793 B2 | 5/2010 | Fuccello et al. | |
| 7,768,963 B2* | 8/2010 | Alizadeh-Shabdiz | 370/328 |
| 7,911,990 B2* | 3/2011 | Alam et al. | 370/312 |
| 7,916,663 B2* | 3/2011 | Yee | 370/254 |
| 7,936,710 B2* | 5/2011 | Gregorio Rodriguez et al. | 370/328 |
| 7,995,468 B2* | 8/2011 | Sakai | 370/221 |
| 8,270,380 B2* | 9/2012 | Peng et al. | 370/338 |
| 8,315,233 B2* | 11/2012 | Alizadeh-Shabdiz | 370/338 |
| 8,464,061 B2* | 6/2013 | Bradley | 713/171 |
| 2003/0065918 A1 | 4/2003 | Willey | |
| 2004/0117500 A1 | 6/2004 | Lindholm et al. | |
| 2004/0264413 A1 | 12/2004 | Kaidar et al. | |
| 2005/0239445 A1 | 10/2005 | Karaoguz et al. | |
| 2005/0251680 A1 | 11/2005 | Brown et al. | |
| 2006/0116107 A1 | 6/2006 | Hulvey | |
| 2006/0128415 A1 | 6/2006 | Horikoshi et al. | |
| 2006/0200862 A1 | 9/2006 | Olson et al. | |
| 2007/0004404 A1 | 1/2007 | Buckley et al. | |
| 2007/0038787 A1 | 2/2007 | Harris et al. | |
| 2007/0055743 A1 | 3/2007 | Pirtle et al. | |
| 2007/0080823 A1 | 4/2007 | Fu et al. | |
| 2007/0141988 A1 | 6/2007 | Kuehnel et al. | |
| 2007/0206537 A1 | 9/2007 | Cam-Winget et al. | |
| 2008/0008121 A1* | 1/2008 | Alizadeh-Shabdiz | 370/328 |
| 2008/0014998 A1 | 1/2008 | Choi | |
| 2008/0046545 A1 | 2/2008 | Koren et al. | |
| 2008/0168129 A1 | 7/2008 | Robbin et al. | |
| 2008/0220719 A1 | 9/2008 | Sakhpara | |
| 2008/0227393 A1 | 9/2008 | Tang et al. | |
| 2008/0250478 A1* | 10/2008 | Miller et al. | 726/5 |
| 2008/0256205 A1 | 10/2008 | Mahoney | |
| 2008/0320190 A1 | 12/2008 | Lydon et al. | |
| 2009/0031035 A1* | 1/2009 | Dharmaraju et al. | 709/230 |
| 2009/0052382 A1* | 2/2009 | Stephenson et al. | 370/329 |
| 2009/0055510 A1 | 2/2009 | Svendsen | |
| 2009/0215388 A1 | 8/2009 | Karaoguz et al. | |
| 2009/0222116 A1 | 9/2009 | Kang et al. | |
| 2009/0271709 A1* | 10/2009 | Jin et al. | 715/739 |
| 2010/0165879 A1* | 7/2010 | Gupta et al. | 370/254 |
| 2011/0281556 A1* | 11/2011 | Choi et al. | 455/411 |
| 2011/0281557 A1 | 11/2011 | Choi et al. | |

FOREIGN PATENT DOCUMENTS

| | | |
|---|---|---|
| EP | 2184892 A1 | 5/2010 |
| EP | 2 387 260 A2 | 11/2011 |
| WO | WO 2007/068164 A1 | 6/2007 |
| WO | WO 2008/008987 A2 | 1/2008 |

OTHER PUBLICATIONS

International Search Report of the International Searching Authority for Application No. PCT/US2010/049663, mailed on Feb. 24, 2011, 7 pages.

Written Opinion of the International Searching Authority for Application No. PCT/US2010/049663, mailed on Feb. 24, 2011, 9 pages.

International Search Report of the International Searching Authority for Application No. PCT/US2011/049589, mailed on Nov. 8, 2011, 5 pages.

Written Opinion of the International Searching Authority for Application No. Application No. PCT/US2011/049589, mailed on Nov. 8, 2011, 13 pages.

"Bluetooth: Connecting Your Devices"; 2009, http://web.archive.org/web/20070408235213/www.bluetooth.com/Bluetooth/Connect/Devi . . . , 2 pages.

"IEEE Standard for Information Technology: Part 11: Wireless LAN Medium Access Control (MAC) and Physical Layer (PHY) Specifications"; 2007, IEEE Computer Society, 145 pages.

Bernstein, Daniel J.: "Curve22519: New Diffie-Hellman Speed Records"; 2006, Public Key Cryptography, pp. 207-228, 22 pages.

Liu, Jingxin et al.; "A Password Based Authentication Protocol for Access Control in WLAN"; 2005, International Symposium on Communications and Information Technologies, vol. 2, pp. 1199-1102, 4 pages.

Wu, Thomas; "The Secure Remote Password Protocol"; 1998, Proceedings Internet Society Symposium on Network and Distributed System Security, pp. 1-17, 17 pages.

Search/Examination Report dated Jan. 5, 2012 from GB Patent Application No. 1114925.9, 2 pages.

* cited by examiner

| NAME | SIZE | VALUE | DESCRIPTION |
|---|---|---|---|
| ELEMENT ID | 1 | 0XDD | VENDOR SPECIFIC AS DEFINED BY [REF. 2]. |
| LENGTH | 1 | VARIABLE | NUMBER OF BYTES IN THE IE (EXCLUDES ELEMENT ID AND LENGTH BYTES). |
| 2 | 3 | 0X00 0X17 0XF2 | APPLE INC. OUI |
| TYPE | 1 | 0X03 | IE TYPE |
| SUB IE | VARIABLE | VARIABLE | SUB IE WITH EASYCONNECT-SPECIFIC ELEMENT IDS. |

FIG. 4A

| NAME | SIZE | DESCRIPTION |
|---|---|---|
| ELEMENT ID | 1 | DEFINED BY THE ELEMENT ID TABLE [REF]. |
| LENGTH | 1 | NUMBER OF BYTES IN THE SUB IE (EXCLUDES ELEMENT ID AND LENGTH BYTES). |
| PAYLOAD | VARIABLE | SPECIFIC TO ELEMENT IDS DEFINED IN [REF]. |

FIG. 4B

| ELEMENT ID | NAME | FORMAT | DESCRIPTION |
|---|---|---|---|
| 0X00 | NAME | UTF-8 | FRIENDLY NAME OF THE DEVICE (E.G. "BOB'S IPHONE"). |
| 0X01 | MODEL | UTF-8 | MACHINE-PARSABLE MODEL OF THE DEVICE (E.G. "MACBOOK2,3"). |
| 0X02 | FLAGS | BITARRAY | FLAGS PROVIDING INFORMATION ABOUT THE DEVICE AS DEFINED BELOW:<br>BIT    NAME    DESCRIPTION<br>0 (0X80)  APCAPABLE  ACCESS POINT IS CAPABLE OF ALLOWING ENROLLEES ONTO ITS NETWORK VIA EASYCONNECT.<br>1 (0X40)  JOINWANTED  ENROLLEE WANTS TO JOIN THE NETWORK VIA EASYCONNECT. |
| 0X03 | OFFERSUBTYPES | UTF-8 | COMMA-SEPARATED LIST OF DNS SRV SERVICE TYPES [REF.6] FOR THE SERVICES THE DEVICE IS OFFERING (E.G. "_PRINTER,_SCANNER"). FOR AN AP, THIS TELLS THE ENROLLEE WHAT FEATURES THE ENROLLEE IS OFFERING. FOR AN ENROLLEE, THIS TELLS THE AP THE SERVICES THE ENROLLE IS OFFERING SO IT CAN CONVEY THAT INFO TO USERS VIA BONJOUR SUB TYPES IN THE ENROLLEE'S BONJOUR PROXY. SEE THE "BONJOUR" SECTION 4.3 OF THIS DOCUMENT FOR DETAILS. |
| 0X04 | OFFERTXT | TXTRECORD | DNS-STYLE TXT RECORD [REF.5] CONTAINING KEY/VALUE PAIRS FOR ADDITIONAL INFORMATION THE ENROLLEE WANTS TO PROVIDE. THESE KEY/VALUE PAIRS WILL BE ADDED TO THE TXT RECORD OF THE ENROLLEE'S BONJOUR PROXY. THE ENROLLEE MUST NOT USE ANY KEY RESERVED BY THIS DOCUMENT. SEE THE "BONJOUR" SECTION 4.3 OF THIS DOCUMENT FOR DETAILS. |
| 0X05 | SEARCHTYPES | UTF-8 | COMMA-SEPARATED LIST OF DNS SRV SERVICE TYPES [REF.6] IF THE ENROLLEE IS LOOKING FOR A SPECIFIC SET OF SERVICES (E.G. "_AP" IF THE ENROLLEE IS LOOKING FOR AN ACCESS POINT). THIS ALLOWS THE AP TO DECIDE IF WANTS TO RESPOND TO ENROLLEE (I.E. IT HAS SERVICES THE ENROLLEE IS INTERESTED IN). THE AUTHORIZER MAY USE THIS TO CONTROL THE SERVICES THE ENROLLEE IS ALLOWED TO ACCESS (E.G. MAY ASK USER "DO YOU WANT TO ALLOW 'BOB'S IPHONE' TO USE YOUR COMPUTER TO PRINT?"). SEE THE "BONJOUR" SECTION OF THIS DOCUMENT FOR ADDITIONAL DETAILS. |
| 0X06 | AUTORIZEDMAC'S | N * 6:MAC | ARRAY OF ENROLLEE MAC ADDRESSES THAT HAVE BEEN AUTHORIZED. THE AP INCLUDES THIS IN ITS PROBE RESPONSES SO ENROLLEES CAN TELL IF THEY HAVE BEEN AUTHORIZED AND SHOULD START WPS. THERE MAY BE MULTIPLE ENROLLEES ACTIVE ON THE NETWORK, BUT NOT ALL OF THEM MAY BE AUTHORIZED. THIS ELEMENT ALLOWS ENROLLEES TO DETECT IF THEY SHOULD START WPS OR NOT. |

FIG. 4C

| WPS ATTRIBUTE | TYPE | DESCRIPTION |
|---|---|---|
| ELEMENT ID | 0X1008 | CONFIGURATION METHODS SUPPORTED BY THE ENROLLEE (E.G. PUSH BUTTON, PIN, ETC.). |

FIG. 4D

0X0001: UTF-8 FRIENDLY NAME. SHOULD BE <= 255 BYTES.
0X0002: RESERVED.
0X0003: RESERVED.
0X0004: RESERVED.
0X0005: BONJOUR SUB-TYPES: COMMA-SEPARATED LIST OF BONJOUR SUB-TYPES (E.G._PRINTER,_SPEAKER).
0X0006: BONJOUR TXT RECORD: TXT RECORD TO BE ADDED. MUST NOT CONTAIN KEYS SPECIFIED IN THIS DOCUMENT.
0X0007: CONFIG DATA: OPAQUE CONFIGURATION DATA A REGISTRAR PROVIDES TO A DEVICE.

FIG. 6

```
"AU"    -- [STRING] UUID FROM THE REGISTRAR SO MULTIPLE REGISTRARS CAN TELL IF THEIR AUTH WAS ACCEPTED.
"EF"    -- [INTEGER] FLAGS ABOUT THE ENROLLEE.
        0X00 -- NO FLAGS SET.
        0X01 -- ENROLLEE HAS BEEN AUTHORIZED BY A REGISTRAR.
        0X02 -- ENROLLEE HAS SUCCESSFULLY JOINED THE NETWORK.
        0X04 -- ENROLLEE REQUIRES A PIN.
"ERR"   -- [INTEGER] ERROR CODE IF THE MOST RECENT JOIN ATTEMPT FAILED.
"MAC"   -- [STRING] REQUIRED: MAC ADDRESS OF THE ENROLLEE (E.G. 00:11:22:33:44:55).
"MODEL" -- [STRING] REQUIRED: APPLE MODEL PROPERTY (E.G. AIRPORT4, 107).
"NONCE" -- [INTEGER] SIMPLE COUNTER FOR CHANGE DETECTION.
```

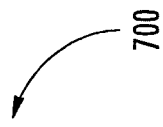

FIG. 7

| KEY | FORMAT | DESCRIPTION |
|---|---|---|
| AF | BITARRAYSTRING | AUTHORIZER FLAGS. FLAGS TO TELL THE AUTHORIZER THE STATE OF EASYCONNECT PROCESS:<br>BIT    NAME    DESCRIPTION<br>0 (0X80)  AUTHORIZED  ENROLLEE HAS BEEN AUTHORIZED BY AN AUTHORIZER (BUT NOT NECESSARILY JOINED).<br>1 (0X40)  JOINED  ENROLLEE HAS SUCCESSFULLY JOINED THE NETWORK. |
| AU | UTF-8 | AUTHORIZER UUID [7] (E.G. "45D62245-A1C7-4E61-8C16-D6E146428F24"). ONLY PRESENT IF AN ENROLLEE HAS BEEN AUTHORIZED BY AN AUTHORIZER SO MULTIPLE AUTHORIZERS CAN TELL IF THEIR AUTHORIZATION WAS ACCEPTED OR IF ANOTHER AUTHORIZER DID IT. |
| CM | BITARRAYSTRING | CONFIG METHODS. THIS IS A HEX STRING VERSION OF THE "CONFIG METHODS" (0X1008) ELEMENT FROM THE ENROLLEE'S WPS IE. SEE [REF.1] SECTION 11 FOR DETAILS. |
| ERR | INTEGERSTRING | ERROR CODE IF THE MOST RECENT JOIN ATTEMPT FAILED. |
| MAC | MACADDRESSSTRING | ENROLLEE MAC ADDRESS (E.G. "00:11:22:33:44:55"). |
| MODEL | UTF-8 | ENROLLEE MODEL (E.G. "MACBOOK2,3") FROM THE "MODEL" ELEMENT OF THE ENROLLEE'S EASYCONNECT IE. |
| NONCE | INTEGERSTRING | SIMPLE COUNTER FOR CHANGE DETECTION. THIS IS UPDATED WHENEVER SOMETHING ABOUT THE ENROLLEE OR EASYCONNECT PROCESS CHANGES. IT ALLOWS THE AUTHORIZER TO DETECT WHEN IT NEEDS TO REPORT CHANGES. ASK THE USER FOR INFORMATION, ETC. |

FIG. 7A

METHODS AND APPARATUS FOR SOLICITED ACTIVATION FOR PROTECTED WIRELESS NETWORKING

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of wireless communications. More particularly, in one exemplary aspect, the invention is directed to methods and apparatus for the solicited addition of a wireless device to a wireless network.

2. Description of Related Technology

Wi-Fi™ is a nearly ubiquitous wireless network (WLAN) technology, enabling connection of devices to the Internet, and ad hoc networking of devices. The relative ease and low cost of set up and administration for Wi-Fi™ networks has contributed to its wide deployment for residential and commercial use (e.g., coffee shops, bookstores, hotels, etc.).

Anecdotally, existing wireless encryption methods are difficult to use for a non-technical user, and may directly result in unsecure networks (e.g., if improperly setup, or not setup at all). Wired Equivalent Privacy (WEP) and the subsequent standards for Wi-Fi Protected Access (WPA and WPA2) are the current de facto standards for Wi-Fi network security. Wi-Fi Protected Setup (WPS) was introduced as an optional network security program by the Wi-Fi Alliance in early 2007. WPS provides an abbreviated network setup solution which reduces the number of steps required to set up a protected Wi-Fi network. WPS requires support of Wi-Fi Protected Access (WPA) or WPA2. The WPS protocol is targeted for non-technical users who know very little of wireless security and may be intimidated by the available security configurations of WPA-type systems.

While WPS shortens the process for adding a device to secure network, additional improvements leveraging the new WPS enhancements may further improve the overall user experience. Specifically, improved apparatus and methods for solicited activation of wireless network security processes are needed. Such apparatus and methods would ideally allow a user or administrator to decide whether or not to add a new device to a wireless network, without the additional steps or knowledge currently required (such as selecting encryption protocols, providing user identifications, identifying oneself, etc.).

Furthermore, such improved methods and apparatus would ideally interface with existing network restrictions transparently, thus remaining fully backward compatible with existing networks and apparatus. An appropriate solution should also consider limitations (such as Wi-Fi Dynamic Frequency Selection (DFS)) of such networks, responsively modifying its operation if necessary.

SUMMARY OF THE INVENTION

The present invention satisfies the aforementioned needs by providing, inter alia, improved apparatus and methods for the addition of a wireless device to a wireless network.

In one aspect of the invention, a method for discovering a wireless network is disclosed. In one embodiment, the method includes: actively scanning one or more allowed channels by transmitting one or more requests; passively scanning one or more prohibited channels by listening for transmitted signals; and discovering a channel based at least in part on at least one of the active or passive scans.

In one variant, the wireless network is a network compliant with IEEE Std. 802.11, the one or more requests are probe requests, and the transmitted signals are beacon signals. The passive scanning includes for example scanning a first frequency range subset corresponding to one or more Dynamic Frequency Scan (DFS) prohibited channels, and the active scanning includes e.g., transmitting the requests over one or more Dynamic Frequency Scan (DFS) allowed channels.

In a second aspect of the invention, apparatus for use in a wireless network is disclosed. In one embodiment, the apparatus includes: a processor capable of executing one or more computer executable instructions; a wireless transceiver; and a memory comprising a computer program executable by the processor. The computer program, when executed by the processor, actively scans for one or more wireless access points via the wireless transceiver; and passively scans for the one or more wireless access points via the wireless transceiver. It also determines whether one or more discovered wireless access points support operation according to a secure protocol; and filters one or more of the discovered wireless access points that do not support the secure protocol.

In one variant, the computer program, when executed, further transmits via the wireless transceiver an information element (IE) to one or more wireless access points that operate according to the secure protocol.

In another variant, the apparatus is compliant with IEEE Std. 802.11, the active scan includes transmitting one or more probe requests, and the passive scan includes receiving one or more beacon signals.

In yet another variant, the passive scan includes scanning one or more radio frequency channels that are prohibited for transmission, and the active scan includes transmitting request messages over one or more channels that are not prohibited for transmission. The passive scan and the active scan can be performed substantially simultaneously, in a staggered fashion, and/or using other schemes.

In a further variant, the determination of whether one or more discovered wireless access points support operation according to a secure protocol includes receiving one or more information elements (IEs) designating one or more security protocols supported by the discovered wireless access points. The one or more IEs can be e.g., embedded within respective ones of management frames in Type-Length-Value (TLV) definitions, or delivered using other approaches.

In still another variant, the apparatus includes no user interface which supports display of network security negotiation parameters.

In another variant, the apparatus is a portable media-capable device (e.g., laptop computer, smartphone, personal media device, etc.). Alternatively, it is a network access point, or non-portable device such as a desktop computer or server.

In a third aspect of the invention, a method for publishing a new enrollee on a wireless network is disclosed. In one embodiment, the method includes: receiving a remote procedure call for a wireless setup protocol, the remote procedure call associated with the new enrollee; determining whether adding the new enrollee would violate a network operational criterion; if the adding of the new enrollee would not exceed the criterion, adding the new enrollee to the list; and publishing a service discovery record for the new enrollee to the wireless network.

In one variant, the wireless network is compliant with IEEE Std. 802.11, and the wireless setup protocol is the Wireless Protected Setup (WPS) protocol.

In another variant, the publishing a service discovery record for the new enrollee to the wireless network includes publishing at least a sub-type description via at least a service discovery protocol (such as for example the exemplary Bonjour protocol developed by the Assignee hereof). Such service discovery protocol may also optionally allows for searching of the record and other records by the aforementioned sub-type.

In a fourth aspect of the invention, a method of forming a wireless network having at least two wireless devices is disclosed. In one embodiment, the method includes: performing a detection protocol using a first of the devices to detect available others of the devices; determining based at least in part on the detection protocol whether individual ones of the other devices support a prescribed security protocol; requesting joinder of the first device to the network where the security protocol is supported; providing information regarding the first device to at least one of the other devices pursuant to the request; and establishing operation between the first device and the at least one other device according to the security protocol.

In one variant, the first device is a client device, and the at least one other device is an access point (e.g., compliant with IEEE Std. 802.11), and the security protocol is Solicited Activation of WPS (SAW). Alternatively, in another variant, the first device is an access point, and the at least one other device is a client device.

In a further variant, performing a detection protocol using a first of the devices to detect available others of the devices includes: actively scanning one or more allowed channels by transmitting one or more requests; and passively scanning one or more prohibited channels by listening for transmitted signals.

In still another variant, determining based at least in part on the detection protocol whether individual ones of the other devices support a prescribed security protocol includes receiving an information element as part of a probe response message.

In another variant, providing information regarding the first device to at least one of the other devices pursuant to the request includes providing a human-assigned, human-readable name or identifier.

The method can be performed substantially automatically and without user intervention, or alternatively with any degree of user involvement or management desired.

Moreover, in another embodiment, at least one of the first device and the at least one other device has no visual user interface, and another device of the network is used to provide user interface capabilities for the first or at least one other device.

In a fifth aspect of the invention, a computer readable apparatus is disclosed. In one embodiment, the apparatus includes a storage medium having at least one computer program, the at least one computer program having a plurality of instructions which, when executed on a computerized device: perform a detection protocol using a first wireless device to detect one or more available wireless devices; determine based at least in part on the detection protocol whether individual ones of the one or more available devices support a prescribed security protocol; request joinder of the first device to the one or more available devices where the security protocol is supported; provide information regarding the first device to at least one of the one or more available devices pursuant to the request; and establish operation between the first device and the at least one available device according to the security protocol.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 4A is a graphical representation of one embodiment of an IE in the context of an exemplary EasyConnect implementation.

FIG. 4B is a graphical representation of one embodiment of the subIE format useful with the invention.

FIG. 4C is a table illustrating one embodiment of implementation-specific subIE elements.

FIG. 4D is a graphical representation of one embodiment of a generic WPS IE.

FIG. 6 illustrates one embodiment of a portion of the vendor specific message adapted to improve "human" usability, comprising a human readable text field, service discovery protocol information, and in-band configuration data, according to the invention.

FIG. 7 illustrates one embodiment of an application-specific text record adapted to provide service discovery information to members of a Local Area Network, according to the invention.

FIG. 7A is a graphical representation of one embodiment of a Bonjour-specific TXT record useful with the invention.

DETAILED DESCRIPTION OF THE INVENTION

Figure 1:
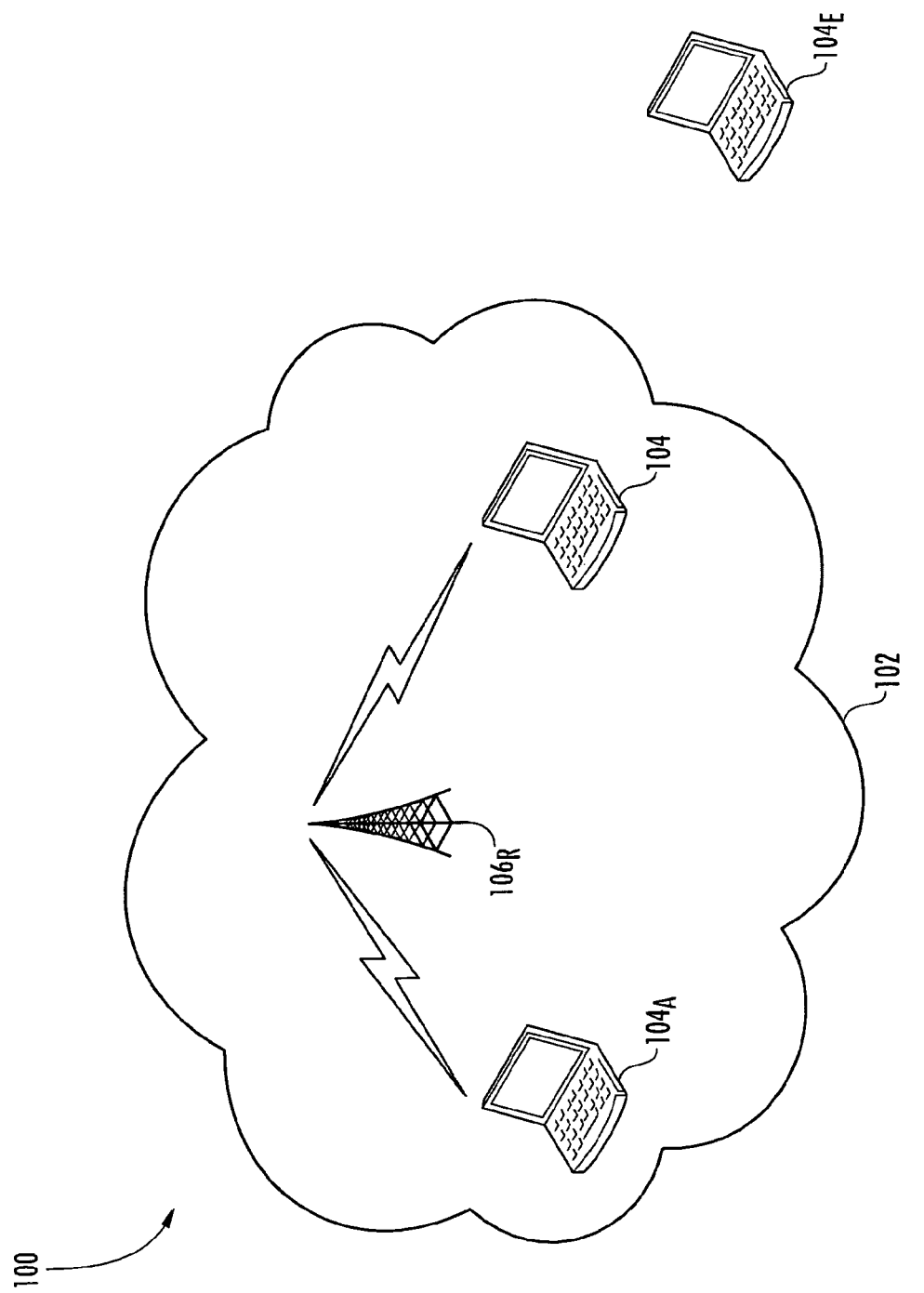
FIG. 1 is a functional block diagram of an exemplary WLAN (e.g., Wi-Fi) wireless network.

Reference is now made to the drawings, wherein like numerals refer to like parts throughout.

Overview

In one salient aspect, the present invention provides methods and apparatus for a device to freely solicit access from an existing wireless network. Existing wireless networks have complex protocols for determining and granting such access, which lend themselves to a relatively high rate of user error. In one aspect, wireless networks are disclosed which reduce the number of required steps for all parties involved in such access requests, and may further reduce the number of parties required. Specifically, methods and apparatus are disclosed for use with enrollee devices that solicit access to a wireless network, and network devices which responsively add the enrollee device.

In one exemplary embodiment, methods and apparatus are disclosed enabling discovery and operations for Solicited Activation of Wi-Fi Protected Setup (SAW), also referred to throughout in one variant as EasyConnect. A wireless device (the enrollee) performs a combination of active and passive wireless scans. The enrollee actively scans or probes all channels which are not prohibited by Dynamic Frequency Selection (DFS), and passively scans any DFS-prohibited channels. The enrollee checks each of the detected networks for EasyConnect support. An Information Element describing EasyConnect support is also disclosed herein for use in this process. For each EasyConnect supporting network found, the enrollee may establish a WPS connection. The enrollee initiates the WPS abbreviated procedures for connection.

By reducing the overall steps required for network administration, processes requiring user input (such as authorization) can advantageously be performed from any device on the network, including "thin" clients. In one variant of the invention, enrollment of a wireless device can even be completed completely automatically when appropriate permissions are granted.

Also, by minimizing the user interface requirements for soliciting devices and/or using other devices as interface "proxies", a variety of "interface-less" clients may be enabled for network operation. In some cases, such interface-less clients may be entirely devoid of a user interface, thereby allowing for rapid and easy association of simpler and lower-cost devices. Such flexibility of networkable devices enables a plethora of new and useful network structures and/or client device types previously not possible.

The invention can also advantageously be employed in literally any functional context; i.e., with the aforementioned "enrollee" functioning as a client device, access point, proxy for another device, or as a peripheral.

DETAILED DESCRIPTION OF EXEMPLARY EMBODIMENTS

Exemplary embodiments of the present invention are now described in detail. While these embodiments are primarily discussed in the context of a Wireless Local Area Network (WLAN) such as one compliant with the Wi-Fi standard(s), it will be recognized by those of ordinary skill that the present invention is not so limited. In fact, the various aspects of the invention are useful in any wireless network that can benefit from solicited activation of protected wireless access as is disclosed herein. Accordingly, as used herein, the term "wireless" means any wireless signal, data, communication, or other interface including without limitation Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, Wi-Fi (IEEE-Std 802.11x, including 802.11n and 802.11 "VHT"), WiMAX™ (802.16), MWBA/802.20, narrowband/FDMA, OFDM, PCS/DCS, analog cellular, CDPD, satellite systems, millimeter wave or microwave systems, acoustic, and infrared (i.e., IrDA), IMT-Advanced, IMT 2000, and 3GPP LTE (long term evolution)/LTE-advanced.

It will also be appreciated that while described primarily in the context of a single wireless network (e.g., WiMAX, LTE, WLAN, etc.), the methods and apparatus of the invention are also applicable to two or more networks which may even be heterogeneous in nature (e.g., different air interfaces, etc.) for improving overall connectivity.

FIG. 1 illustrates an exemplary WLAN (e.g., Wi-Fi) system 100. The Wi-Fi system 100 comprises a network 102 of one or more wireless clients 104, and an access point (AP) 106. In other Wi-Fi configurations, the network 102 may consist only of wireless clients 104 (no access point), engaged in an ad hoc peer-to-peer (P2P) network. As used herein, the terms "client", "client device", and "access point" may include, but are not limited to Wi-Fi capable devices, phones (such as for example an iPhone™), personal computers (PCs), such as for example a wireless-enabled iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As shown, a first wireless client $104_A$ is the designated "authorizer" of the network 102 responsible for authorizing any additions to the network 102. Also shown is a wireless access point $106_R$ operating as a "registrar". The registrar in this embodiment maintains the membership of the network 102. While the authorizer and registrar are shown as distinct elements, it is appreciated that they may be the same network element (e.g., a single entity may perform both acts of authorization and registration), and furthermore, that such capabilities are not limited to clients 104 or access points 106. For example, proxy devices (not shown) may perform the authorizer and registrar functions for other devices.

Also shown in FIG. 1 is a first wireless client $104_E$, which is not currently enrolled in the network 102 (i.e., is not registered with the registrar). The "enrollee" is requesting access to join the wireless network 102.

Referring to the Wi-Fi system 100 of FIG. 1, the extant WPS standard describes a variety of interchangeable variants and scenarios for adding the enrollee $104_E$ to the WPS wireless network 102. The WPS standard identifies four (4) methods for authorization: (i) PIN access, (ii) Push Button Control (PBC) access, (iii) Near Field Communication (NFC) access or (iv) Universal Serial Bus (USB) access. These methods are described in greater detail below.

Wi-Fi Protected Setup (WPS) Authorization Methods

In each of the following access methods specified in WPS, one or more user actions must be performed by both the enrollee and the authorizer to prevent, inter alia, inadvertent additions, or malicious network activity.

(i) The WPS PIN (Personal Identification Number) access method utilizes a PIN to verify the enrollee. The PIN (e.g., read from a sticker, or a display, etc.) is entered at the representant of the network e.g., a wireless access point 106 or the registrar of the network.

(ii) The PBC (Push Button Control) access method requires the user(s) to push a button (either actual or virtual) on both the representant (wireless access point or registrar of the network), and the enrollee device. Support of PBC access is mandatory for wireless access points (APs), and optional for wireless client devices.

(iii) The NFC (Near Field Communication) access method utilizes a RFID (Radio Frequency Identification) passive radio device to verify the enrollee device. The enrollee is brought within range of a RFID capable representant, to allow RFID signaling. NFC Forum compliant RFID tags may be used. NFC is considered an "out-of-band" authorization method, since a RFID device (not a Wi-Fi type device) performs authorization via a different radio frequency. NFC access is optionally implemented within the WPS standard. See also "EPC Radio Frequency Identity Protocols Class 1 Generation-2 UHF RFID Protocol for Communications at 860 MHz-960 MHz-Version 1.0.9" dated January 2005, (commonly referred to as "EPC Gen 2"), which is incorporated herein by reference in its entirety.

(iv) The USB (Universal Serial Bus) access method authorizes the enrollee based on the insertion of a USB stick or "dongle". Similar to NFC, USB is considered an out-of-band authorization procedure. Support of USB access is also optional in the WPS standard.

Wi-Fi Protected Setup (WPS) Authorization Scenarios

Also, the WPS standard identifies at least three (3) basic scenarios for the addition of WPS users: 1) a wireless access point registrar $106_R$ adds an enrollee client device $104_E$; 2) a registrar client device $104_R$ adds an enrollee wireless access point $106_E$; and 3) registrar client device $104_R$ adds an enrollee client device $104_E$, via an intermediary wireless access point 106. More specifically:

1) In a first use scenario specified in WPS, a wireless access point with internal registrar capabilities adds an enrollee wireless client device. In this scenario, the session includes a series of Extensible Authentication Protocol (EAP) request and response messages. The session ends with the registrar access point disassociating from the enrollee device. The enrollee reconnects to the network with a secure configuration.

2) In the second use scenario, a registrar wireless client device configures a wireless access point as an enrollee. The configuration state of the wireless access point is set by the registrar (client device). The registrar may or may not reconfigure the wireless access point (enrollee).

3) In the third use scenario, the registrar wireless client device configures an enrollee wireless client device via a wireless access point. The wireless access point acts as an optional authenticator and/or mediator between the two wireless devices.

Methods

The following discussion augments the various aforementioned authorization methods and scenarios with solicited activation capabilities thereby improving user experience.

Figure 2:
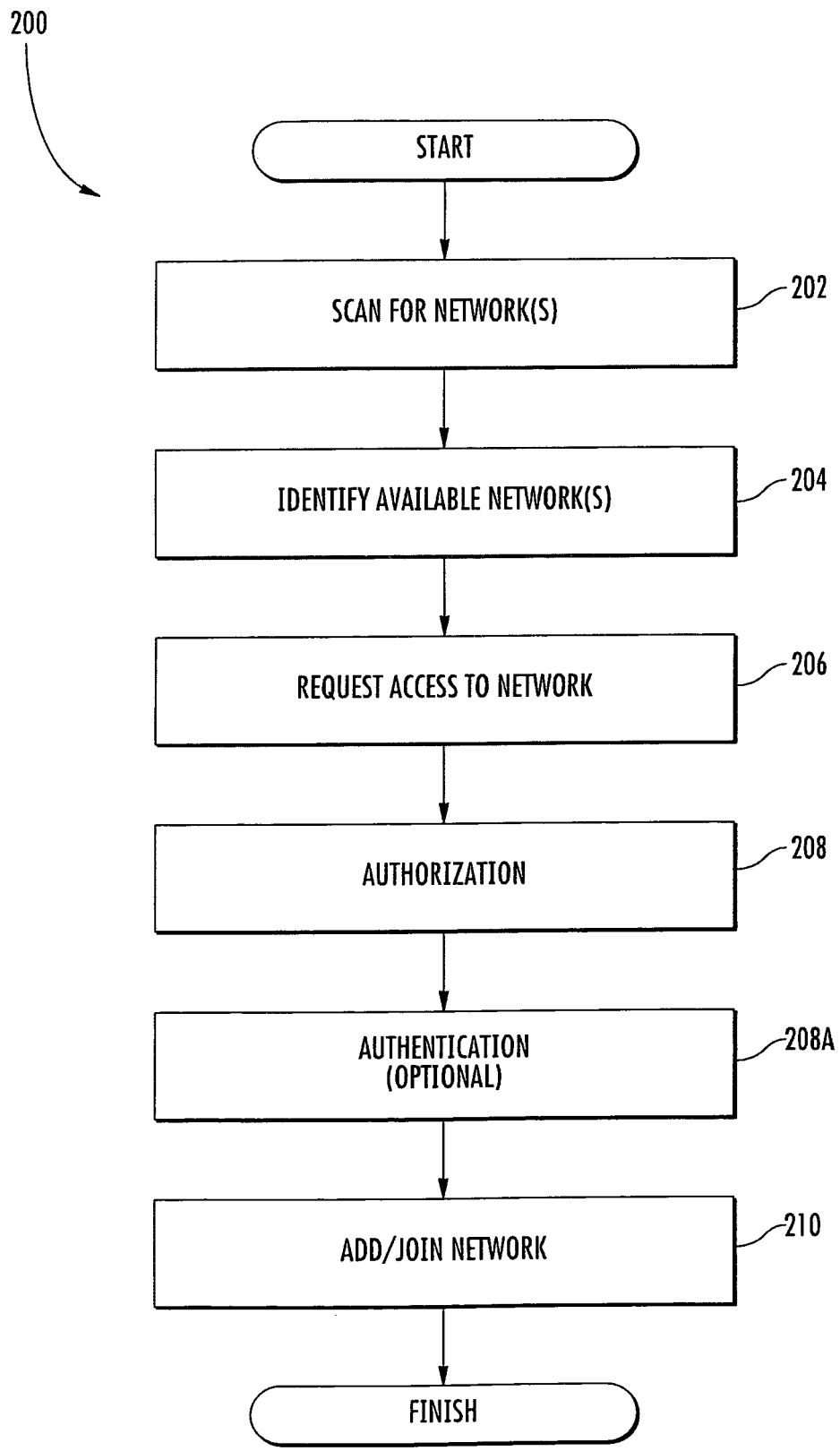
FIG. 2 is a logical flow diagram of one embodiment of the generalized process for solicited access to a secure wireless network, in accordance with the principles of the present invention.

Referring now to FIG. 2, one embodiment of a generalized solicited activation method or procedure 200 for adding a device to an existing protected wireless network according to the present invention is described. It will be appreciated that while described in the context of a client device 104 soliciting access to an AP 106, the methodologies of the invention are in no way so limited.

The primary operative elements as described with respect to the methodology of FIG. 2 are one or more existing wireless networks, and a non-networked wireless device seeking access to the one or more existing wireless networks. The wireless network minimally includes two functional elements: the authorizer, and the registrar. In some embodiments, the authorizer and the registrar are the same device. In alternate embodiments, the authorizer and the registrar are two (or more) distinct devices. The non-networked device seeking network access is termed the enrollee. In some embodiments, the enrollee may be additionally required to successfully authenticate to the network. Thus in certain embodiments, the network may additionally comprise an authenticator. It is readily appreciated that the authenticator functionality may also be performed by the authorizer, or the registrar.

At step 202 of the method 200, the device 104 scans for one or more wireless networks. The scan may be active, passive or a combination thereof. The device 104 may scan only a subset of all resources, or may perform a full scan of all resources. Furthermore, in multi-mode clients, the scan may span resources associated with multiple different networks (e.g., Wi-Fi, WiMAX, etc.). The scan may be automatic, periodic, or triggered. For instance, in one embodiment, the scan is automatically initiated upon power up, or reset. In yet another embodiment, the scan periodically refreshes the available networks on a semi-frequent basis (e.g. hourly, daily, etc.). In yet a further embodiment, the scan may be triggered by one or more events, such as loss of reception (e.g., caused by movement of one device relative to another, etc.) or user interface interactions (e.g., pushing a button, selecting a function, etc.).

In an exemplary Wi-Fi embodiment, the scanning procedure is separated into two parts. In this embodiment, the scanning procedure is performed at device power up (during initialization), and includes a passive scan of a first channel subset, and an active scan of a second channel subset.

Specifically, during the first part, the device 104 passively scans a first frequency range subset corresponding to the Dynamic Frequency Scan (DFS) "prohibited" channels. DFS is a channel allocation scheme used in IEEE 802.11 Wi-Fi networks. DFS allows several neighboring wireless networks to coexist without central management. DFS implements bandwidth restrictions for each of the wireless networks. Accordingly, scanning of the first frequency range subset is a blind or semi-blind detection of "beacons" for DFS networks. Wi-Fi beacons are a specialized data transmission from wireless access points (AP) 106. The beacon signal includes the AP's Service Set Identifier (SSID), its active channel number (s) and one or more information elements (IEs) designating active security protocols transmission beacon can be received by any client device 104 (i.e., it is unencrypted).

During the second of the two parts referenced above, the device 104 transmits probe signals on a second frequency range subset corresponding to the DFS "allowed" (i.e., or not prohibited) channels. Nearby Wi-Fi APs 106 or other enabled devices will responsively transmit a Probe Response or an Association Request/Response messages. Both responses carry Service Set Identifier (SSID), and one or more information elements (IEs) designating active security protocols. It is appreciated that in some embodiments, both the first and the second portion of the scan may be performed simultaneously or sequentially in either order.

It will be appreciated that various patterns of active/passive scan may be performed. For instance, in one variant, the scans are staggered in time, and have substantially no overlap. In another variant, the scans are staggered in time, but overlap to some prescribed degree. In yet another variant, the scans are asymmetric in time and/or other parameters (e.g., frequency bandwidth), such as where it is a priori known or expected that passive scans may yield better results than active scans (or vice versa). The scans may be interleaved or multiplexed, or even occur simultaneously, such as where radio frequency interference is not problematic (i.e., an active scan on one channel does not unduly interfere with a passive scan of another channel).

It is also noted that during the aforementioned "passive" scan of the prohibited channels, if a beacon or other signal is received, then a probe signal can be sent on the prohibited channel (i.e., the previously prohibited channel is no longer prohibited for transmission).

At step 204, the device 104 identifies one or more wireless networks 102 which support solicited activation. The determination may be based on e.g., an embedded information element, or alternatively based on information locally stored at the wireless device 104. For example, the device may maintain an internal database which identifies solicited activation capabilities, based on a received identifier (e.g. SSID). Yet other approaches are readily appreciated by others skilled in the arts.

In one exemplary Wi-Fi embodiment, the determination of solicited activation support is made at least in part by decoding an IE received in step 202. In this exemplary embodiment, the AP 106 broadcasts a signal comprising three (3) bits that identify i) support for Wi-Fi Protected Setup (WPS), ii) support for Solicited Activation of WPS (SAW), and iii) the current WPS mode (i.e. the AP is accepting EasyConnect requests). The implementation specific IE and its constituent bits are described in greater detail hereinafter.

In another exemplary embodiment (which in one implementation is based on the EasyConnect model described subsequently herein), the determination of solicited activation support is made at least in part by decoding a single IE received in step 202. In this embodiment, the AP 106 broadcasts a signal comprising an "APCapable" flag. The implementation-specific IE and its constituent bits are described in greater detail hereinafter.

At step 206, the device seeking access (e.g., Wi-Fi "enrollee") requests access to one or more of the identified wireless networks which support solicited activation. The request may implement one or more security features. The request may comprise additional configuration information if desired or required. Such additional configuration information may include any of a plethora of supplemental information. Common examples of configuration include: the set of particular security modes which the enrollee supports, a human-recognizable identifier, software application-specific identifiers (e.g. Bonjour™ device types, Bonjour TXT records, etc.; see discussion provided subsequently herein of the exemplary Bonjour protocol developed by the Assignee hereof), in-band configuration data (e.g. printer toner settings, audio settings, etc.).

In one embodiment, if multiple compatible networks are nearby, the enrollee may send multiple simultaneous probe requests in parallel to save time. In another embodiment, steps 204 and 206 may combine discovery and access requests, for example, if the enrollee performs its initial scans with a join request flag already set.

At step 208, the device seeking access is authorized by an existing device on the wireless network. While the existing device (e.g., authorizer) is necessarily different from the enrollee, the authorizer in the exemplary Wi-Fi context may be combined with other devices e.g., the registrar, the authenticator, etc. Alternatively, the authorizer may be a distinct device connected to the protected wireless network.

In some embodiments, the aforementioned configuration information identified in step 206 may be used by the authorizer if present, or displayed to a human user via the authorizer (e.g., on a setup display via a GUI). In other embodiments, the authorizer may additionally respond with configuration data of its own (which may or may not be symmetric in type with that sent by the requester). For instance, such additional configuration information may include: a selection of a set of security modes to be used, a human-recognizable identifier, software application-specific identifiers (e.g. Medium Access Control (MAC) addresses), and in-band configuration data (e.g. printer settings, audio settings, etc.).

At step 208A, the enrollee is optionally authenticated by an authenticator device on the wireless network. While the authenticator is necessarily different from the enrollee, the authenticator may be combined with any of the authorizer, or the registrar device, or comprise a separate entity altogether and/or operate via a proxy device or process). In some embodiments, the aforementioned configuration information identified in step 206 is used for authenticating the enrollee, and the authenticator may additionally respond with authentication information (e.g., to support two-way authentication). Common examples of authentication processes and security approaches that may be used consistent with the invention include: public/private key pair exchange, MD5 (Message Digest Algorithm 5), SHA (Secure Hashing Algorithm), AES (Advanced Encryption Standard), stream ciphers, etc. Wi-Fi specific authentication implementations include for example WEP, WPA, and WPA2. In one exemplary embodiment, the authenticator is the same entity as the authorizer and uses HTTPS (Hypertext Transfer Protocol Secure). Standard SSL (Secure Sockets Layer)/TLS (Transport Layer Security) is used for encryption, and HTTP digest authentication is used for authentication.

At step 210, the enrollee is added to one or more of the identified wireless networks. During this step, the enrollee may additionally configure one or more internal device settings in accordance with configuration information extracted from steps 206 and/or 208.

In one exemplary Wi-Fi-based embodiment, the authorization and authentication steps are separate. In one variant, once the Wi-Fi enrollee is authorized, it proceeds to execute a WPS authentication sequence. Once authenticated, the wireless network updates the registrar. The new membership is also propagated to other networked devices. The newly added member may additionally configure its internal device settings accordingly (e.g., updating its namespace, setting its MAC address, etc.).

Figure 3:
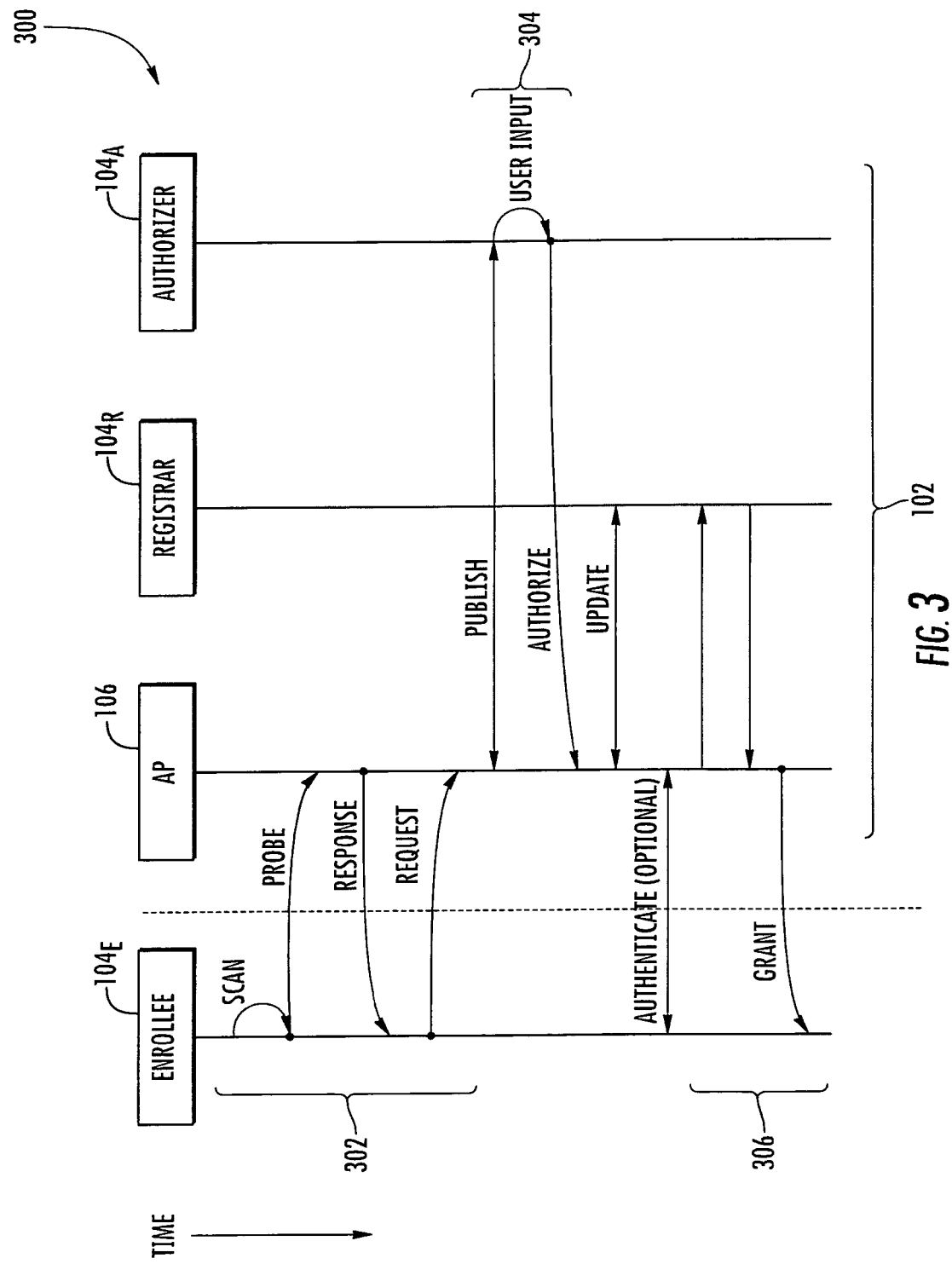
FIG. 3 is a ladder diagram of one implementation of the generalized process for solicited access to a secure wireless network of FIG. 2, as implemented among four distinct entities.

Referring now to FIG. 3, a ladder diagram illustration of one exemplary embodiment of solicited activation methodology 200 of FIG. 2 is shown. It will be appreciated that while the following example is described primarily in terms of Wi-Fi enabled devices and the exemplary Bonjour protocol developed by the Assignee hereof, these contexts are merely illustrative, and the invention may be broadly applied to other WLAN and wireless technologies and/or other implementation protocols.

The primary operative elements as described with respect to the methodology of FIG. 3 are one or more existing wireless networks 102, and a non-networked wireless device (i.e. the enrollee $104_E$). The existing wireless networks 102 can comprise (as little as) a single entity performing access point, authorizer and registrar device functionalities. For clarity, the wireless network 102 in the example of FIG. 3 is shown as three discrete entities, a first device (i.e., the authorizer $104_A$), a second device (i.e., the registrar $104_R$), and an access point 106. A non-networked third device (i.e., the enrollee $104_E$) identifies and requests access to its nearby networks 102. Transactions within the wireless network 102 are "protected" using one or more encryption protocols (e.g. WPS). In one exemplary embodiment, the registrar $104_E$ is the access point 106 of a device providing access. The authorizer $104_A$ is an external entity communicating with the registrar to authorize the enrollee to get onto the network. For example, a printer is an enrollee $104_E$ trying to get onto a wireless network (e.g., "My Network"), provided by an access point. A computer already joined to the wireless network acts as an authorizer to "tell" the access point that it should allow the printer to join the network.

At a first time 302, the enrollee $104_E$ scans for one or more wireless networks, and identifies a nearby wireless network 102 served by an AP 106. The enrollee $104_E$ requests access to the wireless network 102. As shown in FIG. 3, the initial detection of the nearby wireless network is performed in this embodiment by passively scanning for networks, and actively transmitting a probe. The AP 106 replies to the probe with a response carrying one or more parameters identifying support for solicited access to the network. Based on the parameters, the enrollee $104_E$ may decide to connect to the network. The enrollee $104_E$ transmits a request to connect to the network 102 to the AP 106.

Specifically, in the aforementioned scan for a WPS based system, the enrollee $104_E$ passively scans any DFS-prohibited channels for beacons. Once the passive scans have concluded, the enrollee $104_E$ performs an active scan (e.g. sends probe requests) on all channels not prohibited by Dynamic Frequency Selection (DFS).

The exemplary enrollee $104_E$ determines all available EasyConnect capable networks by reading one or more information elements (IE). Information Elements (IEs) are specified within the IEEE 802.11 wireless LAN protocol. IEs provide descriptive information, and are embedded within management frames in Type-Length-Value (TLV) definitions. The IEEE 802.11 standard also provides for vendor specific TLV definitions.

Figure 4:
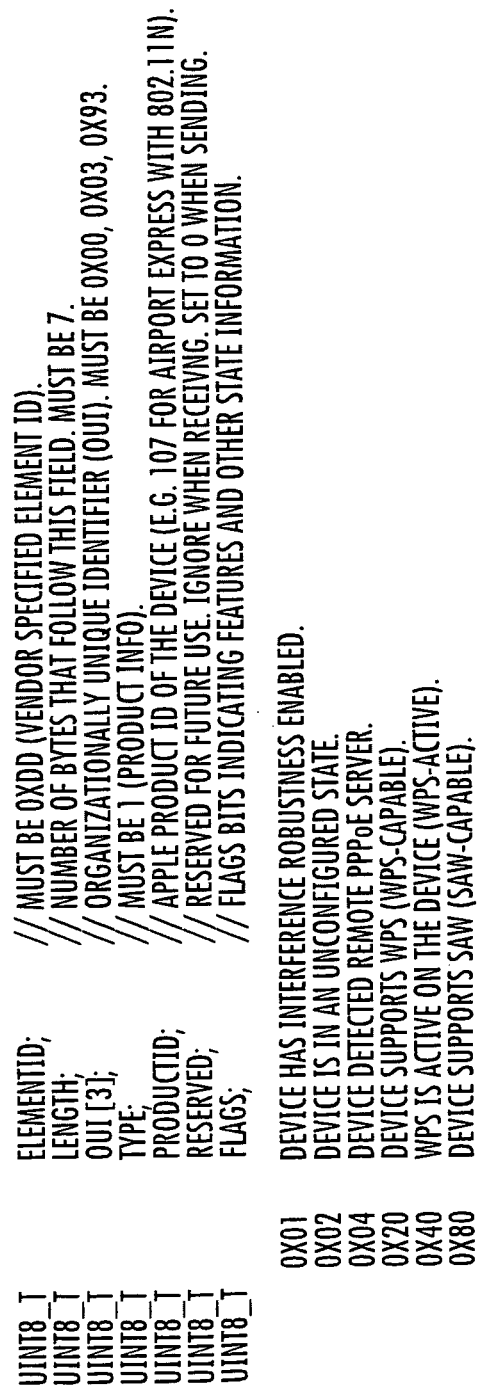
FIG. 4 illustrates one embodiment of a vendor specific information element (IE) adapted to indicate, inter alia, support for solicited access according to the present invention.

In the exemplary Wi-Fi embodiment, the EasyConnect capable network sets a EasyConnect-capable bit within either a generic, or vendor specific IE which is either broadcast for passive reception, or actively sent responsive to a probe. FIG. 4 illustrates one embodiment of a vendor-specific IE 400 useful with the invention. The illustrated vendor-specific IE includes a sequence of unsigned integers representing: an element identification, a length of the TLV, a organizationally unique identifier (OUT), type, product identification reserved bits, and flag bits, although it will be recognized that other information and sequences may be used with equal success.

Networks that support WPS identify such support by setting two flag bits: WPS capable (0x20), and EasyConnect capable (0x80). Furthermore, a third flag bit, WPS active (0x40), is also considered during solicitation activation process. In certain embodiments, the presence of WPS capability is assumed (e.g., only the EasyConnect bit is used). All other networks are ignored by the enrollee $104_E$. It is further appreciated that while the aforementioned TLV is a vendor specific implementation of a general IE, in alternative embodiments, such bits may be generically standardized and understood by any enrollee device $104_E$. Furthermore, in some embodiments, information germane to EasyConnect and WPS may be disseminated with multiple TLV exchanges. Alternatively, other methods for identifying solicited activation support and activity may be used within other network technologies. For example, in alternate systems, such parameters may be broadcast via a control channel, e.g. one used in a UMTS femtocell or cellular network.

In one implementation of the invention, the SAW capable network sets the "APCapable" flag within an EasyConnect specific IE. FIG. 4A illustrates an exemplary EasyConnect specific IE. This EasyConnect specific IE includes a sequence of unsigned integers representing: (i) the element identification, (ii) the length, (iii) the organization-unique identifier, (iv) the type, and (v) one or more subIEs.

FIG. 4B illustrates one embodiment of the subIE format. Each subIE comprises an element ID, a length and a payload.

FIG. 4C is a table of implementation-specific subIE elements. In addition to the EasyConnect IE, a generic WPS IE (shown in FIG. 4D) is also required for EasyConnect operation, for designating the configuration methods supported by the enrollee. In other embodiments, the generic WPS IE is not required, as EasyConnect operation implies WPS support.

Figure 5:
FIG. 5 illustrates one embodiment of a vendor specific message adapted to indicate, inter alia, a request addition to a network supporting solicited access.

Once the enrollee $104_E$ has selected an available SAW network, the enrollee $104_E$ requests access to the selected SAW network. In the generic Wi-Fi implementation, the enrollee $104_E$ sends a special IEEE 802.11 action frame or probe request indicating a EasyConnect request. FIG. 5 illustrates one embodiment of a vendor-specific action frame or probe request 500 according to the invention. The action frame or probe request 500 of this embodiment includes a generic IEEE 802.11 header, a SAW-specific header, and a SAW-specific body although it will be recognized that other information may be used with equal success.

The exemplary SAW-specific header of FIG. 5 includes a category, an organizationally unique identifier (OUI), a type, a subtype, and a version. In some alternate embodiments, the version field may not be required. The SAW-specific header may be used by the registrar (i.e. the intended recipient) $104_R$ internally to assist in software organization, and efficiency.

In one embodiment, the exemplary SAW-specific body includes a vendor specific TLV. For example, the vendor data may be formatted as a WPS-style TLV i.e., the WPS vendor-specific TLV may be partitioned into sub-TLVs. See FIG. 6, which illustrates one embodiment of a vendor-specific TLV 600. The vendor specific TLV 600 includes a text readable name, a Bonjour subtype, a Bonjour TXT record, and configuration data. These sub-TLVs are described in greater detail below.

A text name (i.e., human readable) of the enrollee $104_E$ allows an AP 106, registrar $104_R$, or authorizer $104_A$ to display the name of the enrollee $104_E$ to a user via a GUI or other mechanism. In current WPS standards, the existing descriptor fields (e.g. Device Name) are too short (32 bytes) to accommodate useful human readable names. Accordingly, in the exemplary vendor specific TLV, a text readable name field is provided for e.g., display with user interfaces, etc. In alternative embodiments, a UTF-8 friendly name with no fixed length limit (or at least a reasonable limit, such as 255 bytes) may be codified as a generic WPS attribute (i.e., no additional text readable field necessary). In one exemplary embodiment, the authorizer and the AP/registrar utilize a UTF-8 name from the Easy Connect IE. The AP/Registrar uses the UTF-8 name from the EasyConnect IE for Bonjour publications. Similarly, the Authorizer may require Bonjour text information for UI display to authorizing users.

Configuration data provides enrollee $104_E$ specific configuration data, to be used when the enrollee $104_E$ is accepted onto the network. In-band configuration of devices is described in greater detail in later sections (see "In-Band Configuration" discussion provided subsequently herein).

Configuration mode specifies the mode the enrollee $104_E$ supports. This tells the representant (e.g. the AP 106, or the registrar $104_R$) whether the enrollee $104_E$ supports PIN mode, or push button mode. The AP 106 will publish this information, and the registrar 104R will use it to customize the user interface for letting the enrollee $104_E$ onto the network.

Bonjour Service Discovery

In one embodiment, a TLV is provided that leverages an extant service discovery program (such as for example the Bonjour protocol developed by the Assignee hereof). More generally, other service discovery protocols exist, and are appreciably interchangeable. However, Bonjour is already utilized in; inter alia, the Mac OS X operating system (from version 10.2 onwards), and can be used on Microsoft Windows® operating systems (when installed). The exemplary Bonjour protocol is intended for use on inter alia, local area networks (LANs) to locate devices such as printers, as well as other computers and file sharing servers, and the services that those devices offer. It is also used by content services (e.g., iTunes®) to find shared music, iPhoto® to find shared photos, iChat®, to find other users on the local network, and TiVo Desktop to find digital video recorders and shared media libraries, among other uses. Accordingly, Bonjour is one particularly useful protocol adapted to discover services on a local area network. Bonjour sub-types specify one or more device sub-types to be used when registering the enrollee $104_E$ on the local area network. Bonjour sub-types are discussed in greater detail below.

Bonjour TXT record specifies the Bonjour TXT record entries to add to the text record, when registering the enrollee on the LAN. For example, a printer may want to identify certain features that are needed for configuration.

In certain implementations, the request for solicited activation is made by sending a probe request containing an EasyConnect IE with the "Join Wanted" flag set in the "flags" subIE. The enrollee includes information about itself in the EasyConnect IE (e.g., name, model, Bonjour TXT record, etc.).

Members can search the available Bonjour entries, such as by sub-type. Bonjour sub-types may be used to further identify the type of device. Bonjour allows multiple sub-types to be used concurrently in an attribute-like manner. For example, a given type of device (e.g., an AirPort Express™ device of the type manufactured by the Assignee hereof) may be "sub-typed" as an AP, a remote speaker, and a remote printer simultaneously. Consequently, the device may enumerate itself as any combination of device attributes (e.g., _EasyConnect, _tcp, _ap, _printer, speaker).

Referring back to the solicited activation procedure 300 of FIG. 3, at the conclusion of step 302, the enrollee sends the aforementioned action frame 500 or probe request to one or more SAW compatible networks.

At a second time 304, the AP 106 forwards the request to the registrar $104_R$ and authorizer $104_A$. The authorizer $104_A$ performs access control and accepts or denies the enrollee $104_E$, based for example on one or more inputs from a user (e.g., received via a user interface such as a keypad, touch screen, mouse, etc.). The authorizer's response is forwarded back to the registrar $104_R$.

Specifically, in the Wi-Fi embodiment, if an AP 106 receives the action frame or probe request and is willing to accept the enrollee $104_E$, then it will publish a Bonjour service on its LAN to notify LAN members of the requesting enrollee $104_E$. Bonjour provides a high level application which advantageously does not require additional IEEE 802.11 support for the members already on the network. An authorizer may browse for the Bonjour proxy services published by the AP.

In the illustrated embodiment, the publication of the device presents the text readable name of the enrollee $104_E$ (e.g., "Living Room") for display to an authorizer GUI. The publication of the device specifies a port number in the service record (e.g., SRV) that can be used by the registrar $104_R$ to allow the enrollee $104_E$ on the wireless network (for example, Airport Configuration Protocol (ACP) port 5009). Additionally, the text record keys are defined for additional information about the enrollee. FIG. 7 illustrated one embodiment of a vendor specific text record 700 according to the invention.

In one embodiment, the exemplary text record 700 includes: identification of a registrar; one or more flags indicating enrollee status; an enrollee $104_E$ unique indicator (e.g. a MAC address); and or a cryptographic seed. In one variant, a nonce is additionally provided as a unique number to assist in change detection (i.e., if the nonce has changed, then the network status has changed and requires updating). In one variant, the MAC address is used to uniquely identify the enrollee.

While the foregoing vendor specific text record 700 is described within the framework of the present invention, it is appreciated that alternative methods to allow an enrollee onto the network may likewise be defined. For example, an alternate text record may identify protocols usable with the AP via the Bonjour™ TXT record, including at least one configuration protocol, such as HTTP.

FIG. 7A illustrates one implementation of a Bonjour specific TXT record. In some embodiments, Bonjour TXT record keys indicate additional state information about the enrollee, derived from the one or one or more elements of the EasyConnect IE. The Bonjour implementation of the TXT record provides: authorizer flags, authorizer UUID, configuration methods, error codes, the enrollee's MAC address, enrollee device model, and a change nonce.

In one embodiment, the AP publishes a Bonjour TXT record on its LAN to represent the enrollee. The publication of the TXT record allows members of the AP to discover the enrollee.

Ideally, when an enrollee $104_E$ is detected, the user is notified (by either the registrar $104_R$ or the authorizer $104_A$). In one exemplary notification process, the notification does not grab or steal focus from whatever the user is presently doing, or prospectively annoy the user by popping up windows in an unsolicited fashion. For example, one non-intrusive notification indicator according to the invention includes a small icon and label displayed in the "devices" section of an extant window or sidebar (e.g., the iTunes™ sidebar, or the Mac OS X Finder™ sidebar). If the user selects the enrollee device $104_E$, a user interface for adding the enrollee $104_E$ onto the network is initiated, including any optional configuration information settings.

Ideally, measures should be taken to ensure that the enrollee is actually wanted by the authorizer (as opposed to an unwanted enrollee, such as a neighbor's device). In the exemplary embodiments, the user will most likely be expecting the notification from the enrollee. However, it is appreciated that in other situations, unexpected notifications may still be of interest to the user. For example, a user may "stumble" across an advertised service, etc.

In the exemplary embodiment, the user input is selected from the aforementioned WPS access methods previously discussed. The authorizer $104_A$ presents a UI to enter a PIN (which may be e.g., printed on the case of the enrollee, randomly generated PIN displayed on the enrollee, selected by the user themselves, etc.). Once the user enters the PIN, the authorizer $104_A$ will communicate with the TCP server (of the AP), specified in the illustrated embodiment by the Bonjour service. The registrar $104_R$ then will allow the enrollee onto the network.

For example, in one such implementation an authorizing device (e.g., iPhone, Mac, Windows computer, or other device) may present a dialog box for entering the enrollee's PIN, and an "Authorize" button or interface. The user may read the enrollee's PIN from the device, and "Authorize" the new addition by pressing the button. Responsively, the authorizing device will communicate with the registrar to allow the enrollee onto the network. The authorizer initiates communication with the TCP server which has previously advertised itself with an _easyconnect_tcp Bonjour service. The AP initiates WPS mode. The authorizing device updates the Bonjour TXT record of the AP with UUID (universally unique ID), a PIN (optional), config data, and the enrollee's MAC address. The AP uses this information to allow the enrollee onto the network.

When the authorization process starts on the AP, the AP updates the enrollee's Bonjour proxy to set the "Authorized" flag of the TXT record item (i.e. "af") to reflect the current authorized status. Other authorizing devices monitoring the AP will disregard the presence of the new enrollee (i.e., to prevent duplicative authorizations). The AP adds the UUID of the authorizer via the "au" (i.e. authorizer ID) key to the TXT record of the Bonjour proxy. Other authorizing devices are thus notified which authorizing device had authorized the new enrollee. In some instances, the other authorizing devices may mirror the authorization process, whereas for other implementations, the authorizing devices may prefer to disregard messages from the new enrollee.

Furthermore, the registrar $104_R$ may have configuration options to control which member may be the authorizer $104_A$ for an enrollee $104_E$. For example, the registrar $104_R$ may choose to allow any member of its LAN to be an authorizer $104_A$; or, conversely, it may require an administrative password and/or privileges. The registrar $104_R$ in one variant never allows authorization from a non-member device (i.e., a device outside of its LAN) without some form of authentication and encryption it (e.g., a password-protected, encrypted VPN tunnel).

Finally, at a third time 306 of FIG. 3, the registrar $104_R$ adds the enrollee $104_E$ to the network. Adding of the enrollee $104_E$ may be contingent upon one or more supplemental operations. For example, in some embodiments, the enrollee $104_E$ may additionally be required to perform multiple authentication responses. In another example, the enrollee $104_E$ may additionally be required to set one or more parameters for device operation.

In the foregoing exemplary embodiment, once the access point 106 has entered WPS mode, the access point 106 will set the WPS active bit in the vendor specific IE to indicate to the enrollee $104_E$ that the access point 106 has enabled WPS. Additionally, it includes the MAC address of the enrollee $104_E$ in the IE, thus explicitly identifying the enrollee $104_E$. This allows the enrollee $104_E$ to ignore other access points that may also have WPS active, or are active for a different enrollee $104_E$.

When the enrollee $104_E$ sees that an AP 106 has activated WPS and is advertising the enrollee's MAC address, the enrollee $104_E$ will try to join that network via WPS. If the join is successful, the AP 106 will turn off WPS, return to normal operation, and update the Bonjour TXT record to indicate the enrollee $104_E$ has successfully joined. After the enrollee $104_E$ successfully joins, the AP 106 de-registers the Bonjour service. In some embodiments, the Bonjour service is left active for a short period (e.g., one minute) after the enrollee $104_E$ has joined. This allows the registrar $104_R$ (which may be different from the access point) to detect that the enrollee $104_E$ has successfully joined.

If the join fails, the access point 106 will update the Bonjour TXT record to include the error code (i.e. "err" TXT record), increment a cryptographic element such as a nonce (e.g., a cryptographic seed used to prevent playback attacks), and return to an "unauthorized" state (i.e. deflag "af"). This allows the registrar $104_R$ to detect that the join failed.

The following discussions describe additional considerations relating to, and variations of, one or more aspects of the invention.

Security and Access Limitations

No wireless access protocol is completely secure. In fact, security systems are generally described with responses to a brute force attack (e.g., repeated attempts), because such metrics are compared easily. Accordingly, a large number of possible schemes exist to enforce network security. These are well known throughout the arts, and generally include (without limitation): increasing time intervals between subsequent retries; limiting the number of retries; and limiting the membership of the network (such as via PINs, authentication, requirement for key pairs, etc.). It is readily appreciated that any of the foregoing methods are readily applicable and useful with the invention described herein, either individually or in combination. While a user should not be granted limitless access to repeatedly retry, some scenarios are purposely constructed to be more forgiving than others.

For example, in the foregoing exemplary embodiment of FIGS. 2-3, the Wi-Fi system is intended for use with a non-technical audience; accordingly, the enrollee should be allowed to retry multiple times (say for example five), but not unreasonably so. One likely cause of failure is the user entering the wrong PIN. Accordingly, the registrar may opt to prompt the user for the PIN again. The registrar will need to reauthorize for the enrollee to attempt another join. Care must be exercised in retry attempts to prevent the aforementioned "brute force" attacks. Consequently, if an enrollee repeatedly fails, defensive countermeasures can be taken.

In one exemplary implementation, an enrollee may retry failed connections multiple times, by simply "waiting". For instance, the enrollee fails to join the network (e.g. the user entered the PIN incorrectly), the enrollee must wait an exponentially increasing interval between retries. Such a "delay" type scheme grows beyond a practical limit for repeated failed attempt, thereby frustrating surreptitious access attempts. If a request is received from an enrollee, additional requests will be dropped for increasing periods of time: 2 seconds, 4 seconds, 8 seconds, etc.

In yet another exemplary implementation, an enrollee may consecutively retry failed connections only a limited number of times up to a prescribed threshold; for example, three (3) times. A "locking" type scheme is used to silently reject attempts for access once the locking threshold has been reached. A simple counter tracks the number of failed connections; for each failed connection attempt, the counter increments. In some embodiments, the counter may reset upon successful connection. Once the locking threshold has been reached, the enrollee can be forced to require external assistance. For example, a networked member (e.g., the authorizer) may be required to reset the connection failure counter.

In yet another exemplary implementation, the registrar is limited to a set number of active enrollees at any one time. For example, in one implementation, there can be at most five (5) active enrollees any time. If there are five (5) active and recent enrollees, and another enrollee requests access, then the new enrollee will be silently dropped (i.e., the authorizer is not notified of any enrollee request). In this embodiment, an enrollee is considered "active" if the AP has received a Easy-Connect action frame or probe request from the device within a prescribed time interval (e.g., 3 minutes). Accordingly, within this system, enrollees can be required to send Easy-Connect action frames or probe requests periodically to remain active.

Furthermore, other variants within a membership-based scheme are also possible. For example, various gradations or categorizations may be useful. In one scenario, an enrollee is considered "recent" if the first EasyConnect action frame or probe request the AP received from that enrollee was in the last n minutes (e.g., 3 minutes). If there are 5 active enrollees, but only 4 recent enrollees, then the AP can drop the "quiet" enrollee to make room for the new enrollee.

Furthermore, there may be certain prioritized clients which are never "kicked". For example, a user may decide that a particular client is always allowed, even when rarely used. Such designations may be useful for entities such as network based storage, or media servers.

In-Band Configuration

A significant consideration in implementing the present invention is improvement to user experience (including ease and rapidity with which desired device connections can be established). One salient problem with extant methods of wireless discovery and management relates to a lack of user input in the network setup process. Specifically, solicited activation enables the addition of user-interface-less clients to wireless networks.

Accordingly, In-band configuration provided by the present invention enables the user to provide some degree of minimal configuration as part of the WPS negotiation process. For example, this may allow a registrar to let the user choose a name for the device, provide an administrative password, and other utility options. Device configuration is generally handled via existing device specific software, thus device configuration via the present invention is not intended to be a complete configuration protocol. Instead, it augments extant device configuration methods, to improve the overall user experience by reducing the number of user interfaces the user needs to interact with.

For example, when a customer first receives a device, the device generally has factory settings, which in some cases are not desirable or applicable to the intended use(s). Factory programmed device names are typically not intelligible, and device passwords are usually not sensible or readily recalled by a given user. Even though the present method may greatly facilitate network setup, the device itself may be poorly named (e.g. "Device 001122"). Accordingly, in one variant of the invention, EasyConnect methods provide an in-band configuration menu or other user interface to enable enhanced user input and experience. In-band configuration data is provided or generated by the authorizer, registrar and/or enrollee. The format of the configuration data is made flexible for multiple uses, but remains within the constraints of EasyConnect. In one exemplary use case, the access point delivers one or more user configurations to the enrollee as part of the "Encrypted Settings" section of Message M8 (see section 7.3.9 of [1] for details). In one exemplary embodiment, the in-band configuration parameters comprise a name and a password for the device. In other exemplary embodiments, the in-band configuration parameters may be used to exchange device specific parameters (such as a text name for the print queue of a printer, etc.).

Example Operation Scenarios

The following examples illustrate one or more aspects of the invention disclosed herein.

In one example scenario, a customer powers on a wireless networking device with audio speaker capabilities (e.g., an AirPort Express device manufactured by the Assignee hereof). This device does not have an indigenous user interface. Instead, authorization of the device is performed by the customer who has a concurrently running Solicited Activation Wi-Fi (SAW) registrar application running on their PDA or smartphone (e.g., iPhone). The PDA or smartphone displays a list of nearby devices compliant with SAW (including the wireless audio device). The customer authorizes the wireless audio device to join the network via the PDA/smartphone user interface. The wireless audio device connects to the network, and is represented within a host software application (e.g., an iTunes application running on the PDA or smartphone, or a nearby laptop computer) as a remote audio speaker.

In another example scenario, a user wants to add a printer that supports Wi-Fi to a Wireless Local Area Network (WLAN). When the printer is powered on, it searches for nearby EasyConnect enabled wireless networks. The user runs a configuration utility on a networked personal or laptop computer. Even though the printer is not "networked" per se, the PC or laptop displays the printer for authorization and configuration. The user selects and configures it (e.g., gives it a recognizable name, and sets printer-specific options such as toner level) via a graphical user interface or menu structure. After configuration, the user selects "Add Printer". The printer uses EasyConnect procedures as described herein to automatically and securely exchange wireless credentials and in-band configuration information. The printer joins the wireless network, and is ready to print from any computer (such as the PC or laptop) on the network, or at the behest of another device designated by the user as having such control.

The users in the foregoing scenarios do not have to perform all of the steps commonly associated with adding wireless networking devices (e.g.; wireless network switching or reconfiguration, providing passwords, inputting network addresses, etc.), thereby underscoring a salient advantage of the invention.

Referring now to FIGS. 8-14, the operation of the invention as applied to the first operation scenario above is described in detail. Specifically, in this illustration, the user adds an enrollee device (e.g., AirPort Express) to a wireless network provided by an access point performing the registrar functions (e.g., Time Capsule™ device manufactured by the Assignee hereof). The AirPort Express executes a first enrollee process 800 shown in FIG. 8. The Time Capsule executes a host access point daemon process 900 shown in FIG. 9, and AirPort Configuration Protocol (ACP) daemon process (FIGS. 10-13).

Figure 8:
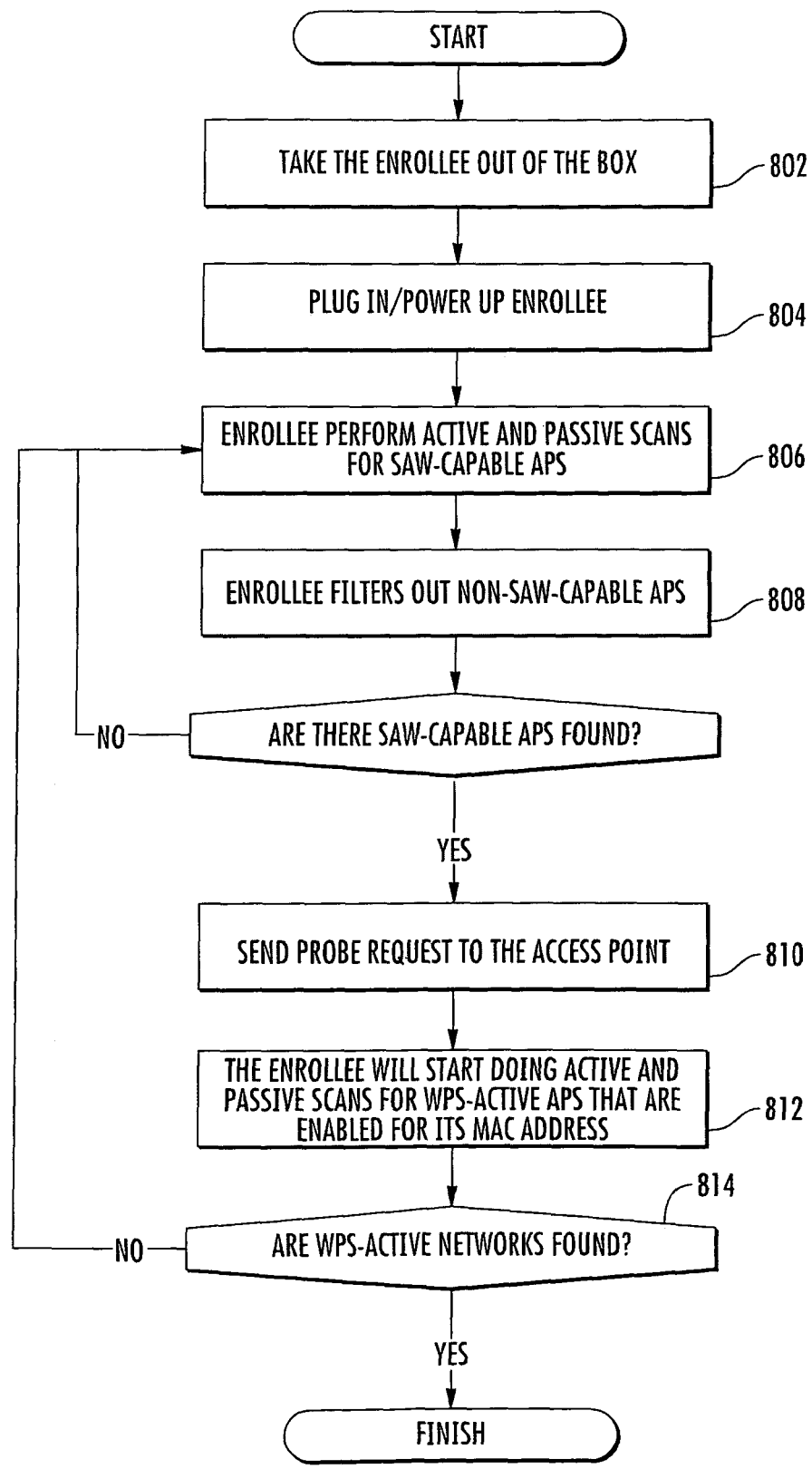
FIG. 8 illustrates one embodiment of an enrollee process executed by a wireless media-capable accessory according to the present invention.

Referring now to FIG. 8, at step 802 the AirPort Express is taken out of the box and plugged in to a wall outlet or other power source at step 804. At step 806, the AirPort Express powers on, and initiates a series of active and passive scans for SAW-capable APs. The AirPort Express identifies all SAW capable APs, and filters out all non-SAW-capable APs at step 808. If the AirPort Express cannot identify any SAW-capable APs, then the AirPort Express will continue scanning.

For each SAW-capable network the AirPort Express finds, it sends EasyConnect action frame or probe request to the access point at step 810. Responsive to the action frame or probe request, the nearby identified SAW-capable APs will identify itself with a WPS-active flag, and a MAC address corresponding to the AirPort Express. This process is described in the Time Capsule description provided subsequently herein.

At step 812, the AirPort Express waits for a response. The AirPort Express will start active and passive scans for any WPS-active APs that are enabled for its MAC address. At step 814, if no WPS-active networks are found by the AirPort Express, then the AirPort Express must assume that it is not accepted. Consequently, it will restart its discovery process (i.e., rescan for all SAW-capable networks). If a WPS-active network is found, then the AirPort Express joins the network.

The aforementioned Time Capsule device of the present example includes two distinct entities: hostapd (Host Access Point Daemon), and ACPd (AirPort Configuration Protocol Daemon).

Figure 9:
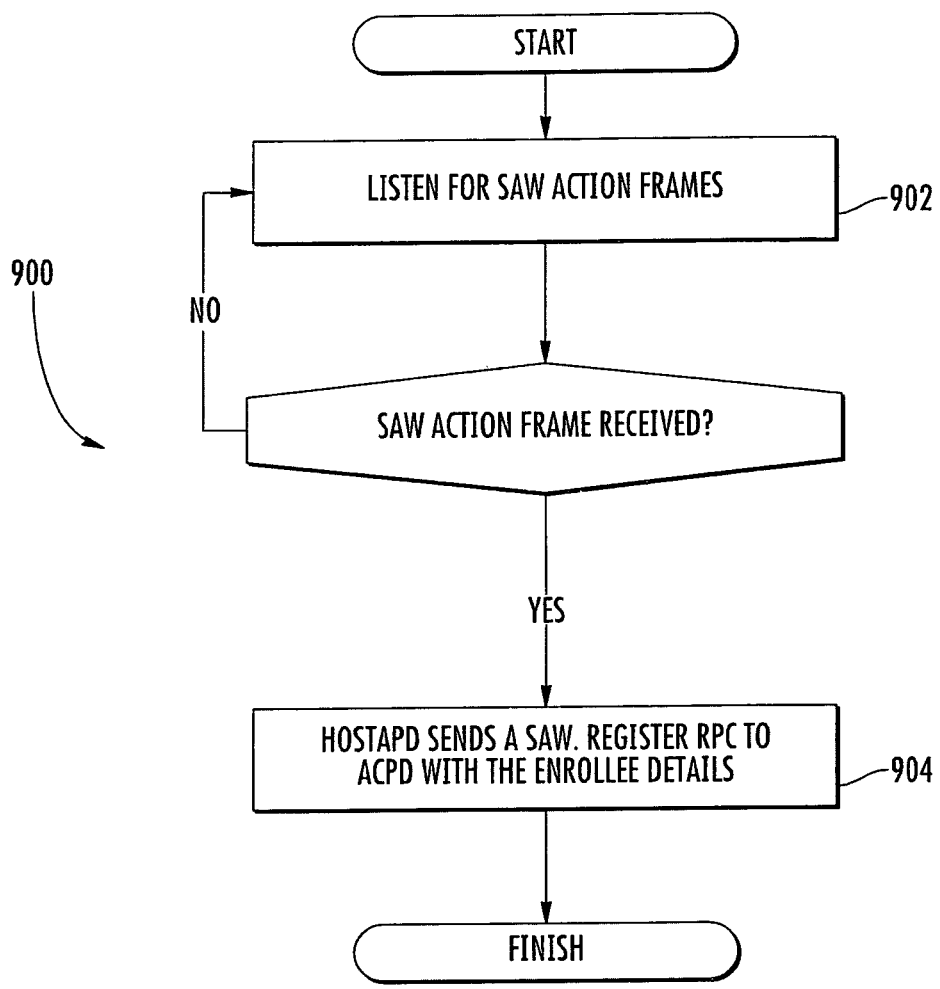
FIG. 9 illustrates one exemplary embodiment of a registrar/authorizer/access point process executed by an exemplary wireless network-attached storage device, according to the present invention.

FIG. 9 illustrates the operation of the Time Capsule hostapd process 900. The hostapd process constantly monitors for EasyConnect action frames or probe requests 902. When an EasyConnect action frame or probe request is received, the hostapd sends a saw.register remote procedure call (RPC) to the ACPd with the enrollee details 904.

Figure 10:
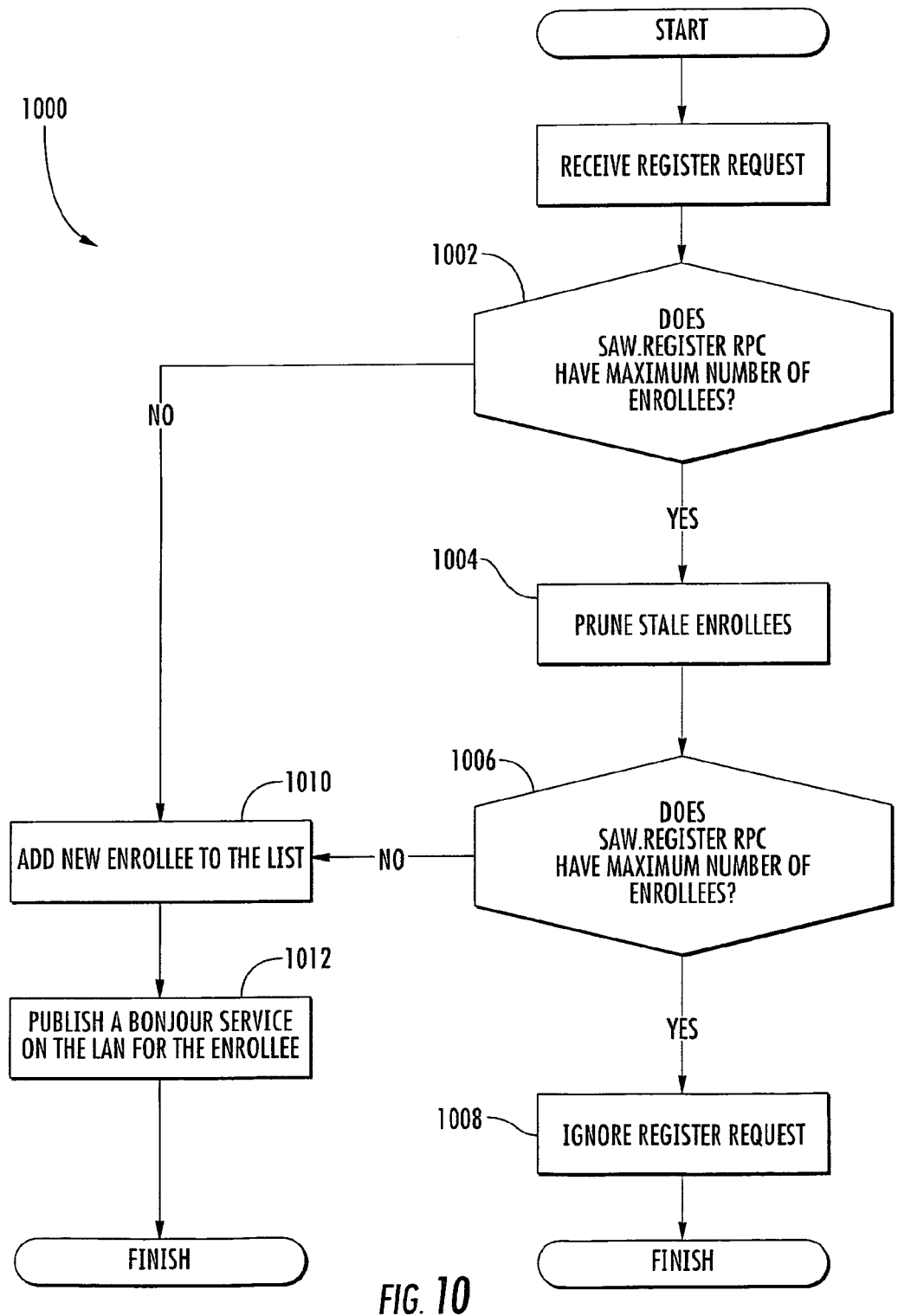
FIG. 10 illustrates one embodiment of the access point functionality of the process of FIG. 9 in greater detail.

FIG. 10 illustrates the Time Capsule's ACPd process 1000. When the ACPd process receives a saw.register RPC, the Time Capsule determines if it may allow the new enrollee (i.e., the AirPort Express) onto the network. First, at step 1002, the ACPd determines if it already has the maximum number of enrollees. If the ACPd has extra enrollees, it attempts to prune stale enrollees at step 1004. If the ACPd determines that the maximum number of enrollees has been reached at step 1006, then the register request is ignored at step 1008. Otherwise, the ACPd will add the new enrollee to the list at step 1010, and publish the enrollee on a Bonjour service discovery listing of the LAN at step 1012. In some embodiments, the rejecting of an enrollee is logged internally or externally indicated. In embodiments where the expected frequency of enrollee rejection is likely, logging or indications may be suppressed. In one variant, no log or indication is given and logging space is reserved for more important messaging.

Figure 11:
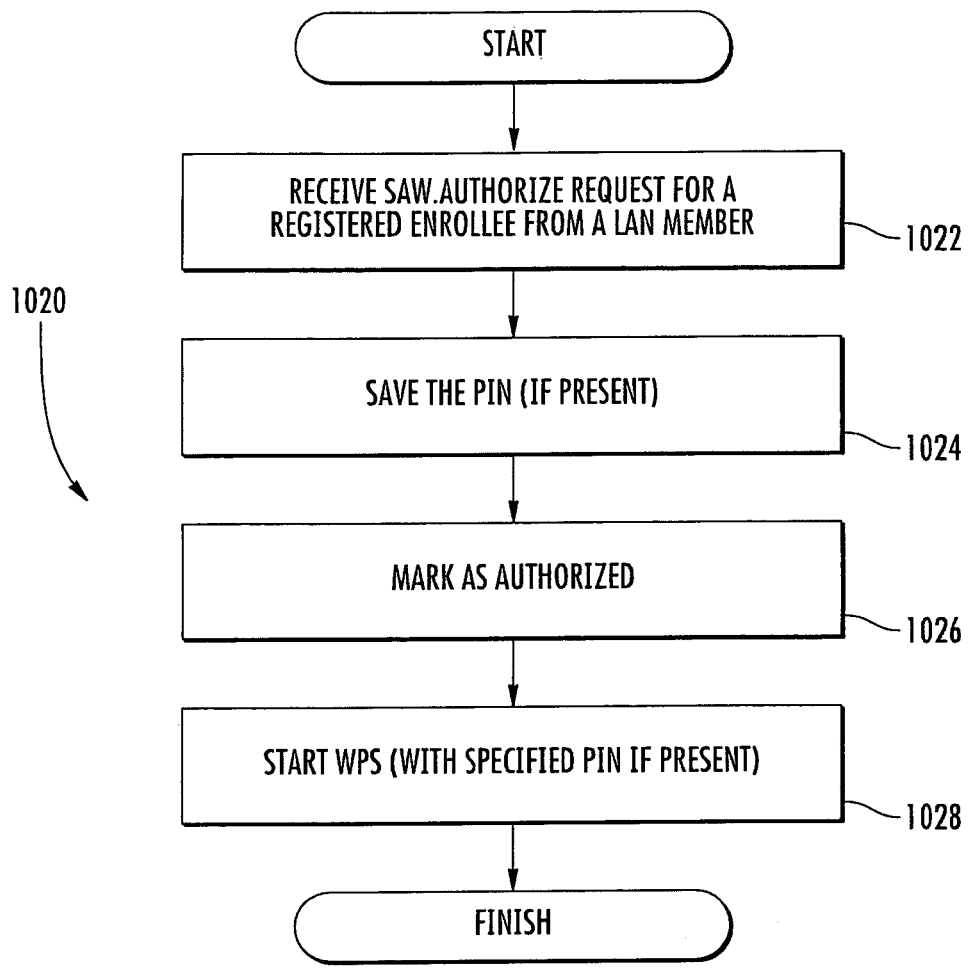
FIG. 11 illustrates one embodiment of the registrar and authorizer point functionality of the process of FIG. 9 in greater detail.

After the Time Capsule ACPd has initiated the Bonjour listing, it will wait for a response from the authorizing LAN member. The Time Capsule ACPd will monitor for any valid saw.authorize requests from existing LAN members (e.g., from the authorizer). Once the enrollee is authorized, the methodology of FIG. 11 is invoked. FIG. 11 illustrates one embodiment of starting of WPS processes 1020. At step 1022, a saw.authorize request for the AirPort Express is received from an authorizing LAN member. The Time Capsule saves the enrollee, the PIN (or other Access Method identification) and authorization, to its registry at steps 1024 and 1026 respectively. After updating its internal registry, the Time Capsule initiates WPS procedures with the enrollee using the specified PIN at step 1028.

Figure 12:
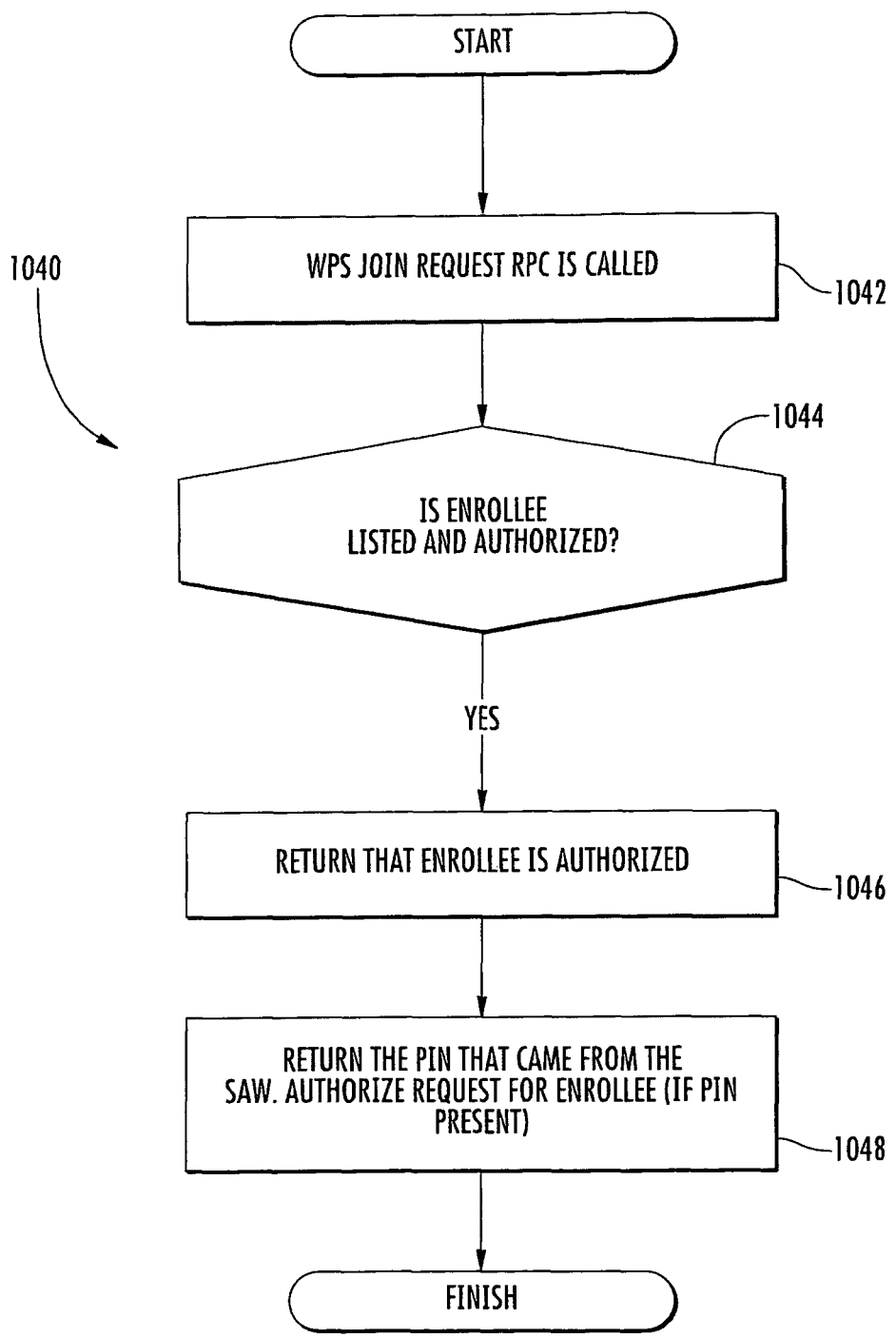
FIG. 12 illustrates one embodiment of the registration function of the process of FIG. 9 in greater detail.

In FIG. 12, the Time Capsule waits for the new member to attach to the network 1040. At step 1042, the Time Capsule receives a WPS join request RPC. Once the Time Capsule receives the join request RPC from the enrollee, it checks that the enrollee is in its internal registry, and is appropriately authorized per step 1044. For authorized enrollees, the Time Capsule returns that the enrollee is authorized at step 1046, and its corresponding PIN (step 1048) as read from the internal registry (i.e. the PIN is retrieved from the saw.authorize request for this enrollee). If the enrollee is not listed or authorized, the Time Capsule rejects the enrollee.

Figure 13:
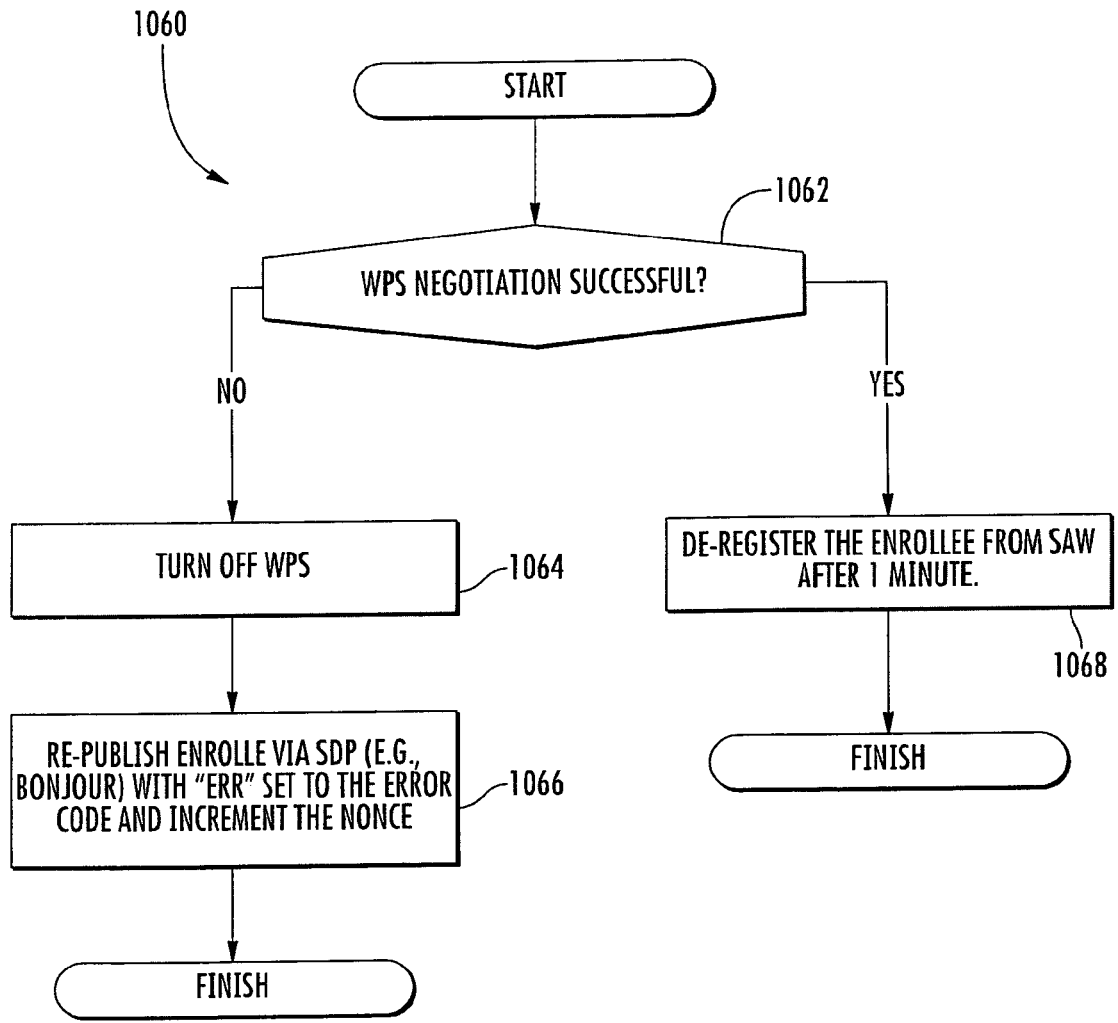
FIG. 13 illustrates one embodiment of the initiation of Wi-Fi Protected Setup (WPS) of the process of FIG. 9 in greater detail.

Lastly, in FIG. 13, exemplary WPS negotiation processes 1060 are shown. If WPS negotiation succeeds (step 1062), the Time Capsule deregisters the enrollee from SAW after a prescribed time; e.g., one (1) minute (step 1068). If WPS negotiation fails, then WPS is aborted (step 1064), and the enrollee is republished via Bonjour with an error code (step 1066). In one embodiment, a nonce element is changed to prevent "playback" attacks (i.e., network attacks where a valid data transmission is maliciously or fraudulently repeated).

Fully Automated Enrollment

In another embodiment of the invention, enrollment of a wireless device can even be completed completely automatically when appropriate permissions are granted. For example, an enrollee or client device can be configured from the manufacturer or the point of sale (or via other means) to include user-specific information, such as by programming via an RFID or near-field communication (NFC) device programmer or interrogator of the type well known in the RF arts (akin to the programming of portable RFID devices such as the prior art "Mobil Speedpass" for use at gas stations). Programmed user specific data (e.g., user name, PIN, device name, etc.) can be input at time of purchase (e.g., via an online website, at a point of sale device, etc.), or even drawn from an existing credit card, smart card, or other device. This information can be stored in a non-volatile storage device of the enrollee device, to be accessed at time of enrollment (e.g., when the user places the device within their network). When plugged in or turned on for example, the programmed enrollee device would initiate the exemplary protocol 200 of FIG. 2 described above (e.g., active/passive scans), and based on detection of an AP 106 or other network device, begin the negotiation process. However, unlike the foregoing methods, the pre-granted "permissions" programmed into the AP and/or enrollee device will allow an enrollee device displaying proper credentials (e.g., user name=X, PIN=Y, and security protocol supported=Z, etc.) to associate with the network automatically, and with no user intervention. This approach advantageously provides a completely seamless user experience.

Apparatus

Figure 14:
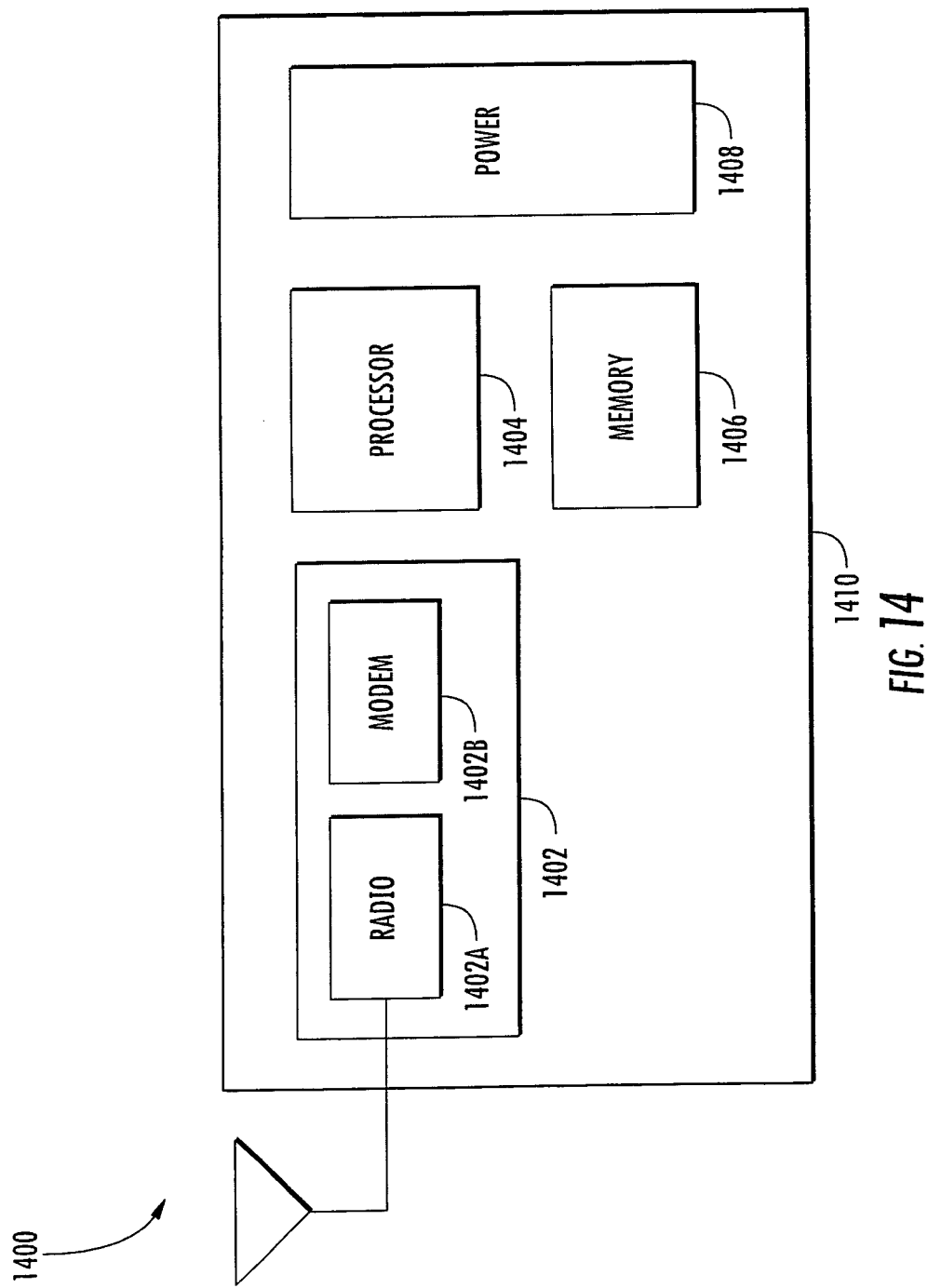
FIG. 14 is a functional block diagram illustrating one embodiment of a wireless apparatus adapted to implement the methods of the present invention.

Referring now to FIG. 14, one embodiment of an exemplary apparatus (e.g., client 104) useful in implementing the methods of the present invention is described. The exemplary wireless apparatus includes a radio modem subsystem 1402, a processing subsystem 1404, a memory subsystem 1406, and a power subsystem 1408 mounted on one or more substrates 1410.

The radio modem subsystem 1402 includes a radio 1402A, and a modem 1402B. The radio modem subsystem 1402 provides data transmission and reception capabilities for the wireless device 104. While the foregoing discussion refers to an IEEE 802.11 compliant radio modem subsystem, it is readily appreciated that other wireless and wired implementations may be used consistent with the invention.

The processing subsystem 1404 of the device 104 may include a digital signal processor, microprocessor, field-programmable gate array, or plurality of processing components. The processing subsystem enables execution of a software application, comprising a set of computer readable instructions. The processing subsystem is operatively coupled to a memory subsystem 1406. While the exemplary apparatus utilizes software (i.e., any sequence or human or machine cognizable steps which perform a function, such as a computer program); it is appreciated that in other implementations, the techniques described previously herein may be performed in firmware, or alternately, codified directly in hardware (e.g., logical gates, sequential memories, etc.).

The memory subsystem 1406 includes for example RAM, ROM, Flash, and/or disk drive components. The memory subsystem 1406 may implement one or a more of Direct Memory Access (DMA) type hardware, so as to facilitate data accesses, as is well known in the processor arts. The memory subsystem stores the aforementioned computer readable instructions. The memory subsystem may also retain transitive data or instructions useful for intermediate processing operations of the processing subsystem 1404 (e.g., a software stack, etc.). As used herein, the term "memory" includes any type of integrated circuit or other storage device adapted for storing digital data including, without limitation, ROM.

PROM, EEPROM, DRAM, SDRAM, DDR/2 SDRAM, EDO/FPMS, RLDRAM, SRAM, FLASH memory (e.g., NAND/NOR), and PSRAM.

The illustrated power management subsystem (PMS) 1408 provides power to the apparatus, and may include an integrated circuit (IC) and/or a plurality of discrete electrical components. In an exemplary portable client apparatus 104, the power management subsystem interfaces with a battery (which may be supplemented with a recharging capability, solar cells, or other power generating apparatus not shown). In alternate non-portable apparatus (e.g., a fixed AP or the like), or semi-portable apparatus, the power management subsystem may receive external power (e.g., using a wall outlet, car adapter, etc.), and provide power conditioning capabilities (e.g., surge protection, blackout or UPS functionality, etc.)

In one embodiment of the wireless apparatus 104, the power management subsystem 1408 supplies power to the processing subsystem 1404 and memory subsystems 1406. The processing subsystem 1404 actively interfaces the memory subsystem 1406 to perform a plurality of initialization processes (e.g., booting, etc.). Once the processing subsystem 1404 has completed internal initialization, the processing subsystem initializes peripheral subsystems; e.g., the radio modem subsystem 1406. The wireless apparatus then executes the software application which performs one or more steps of the previously described solicited activation procedure 200 (FIG. 2, et seq).

As described previously, the solicited activation procedure employs the participation of three (3) or more distinct functional elements: the enrollee, the authorizer, and the registrar. Optionally, an authenticator may be additionally required. The following discussions summarize the portions of the foregoing procedures, when executed within the wireless apparatus of FIG. 14.

In one exemplary embodiment, the wireless device may execute a software application adapted to perform the enrollee function. Accordingly, the enrollee performs one or more functions selected from: scanning for SAW capable networks 202, identification of SAW capable networks 204, requesting of access 206, and the client steps of the optional authentication procedure 208A (e.g. WPS).

It is further noted that the apparatus of FIG. 14 may take on any number of configurations. For example, common enrollee devices range from handheld PDAs, smartphones, and computers, to network appliances such as printers, copiers, and media servers. Accordingly, many enrollee devices additionally include multiple other application-specific subsystems, including user interfaces, more extensive memory subsystems, specialized apparatus (e.g., printing apparatus), audio visual components, etc.

The enrollee apparatus is adapted to scan for one or more wireless networks via active probes, passive scans or a combination thereof. In some embodiments, the radio modem 1402 may actively transmit access probes. The radio modem 1402 may also be configured to tune in to one or more physical resources, such as time, frequency, code, or a combination thereof. In yet other embodiments, the radio modem 1402 may actively transmit probes on a selected first subset of resources, and passively scan a second set of resources. Accordingly, the radio modem subsystem 1402 can selectively modify its operation. For example, in common Wi-Fi transceivers, a first set of resources are indicated as available for active probing, and a second set of resources is indicated as prohibited for probing. Within Wi-Fi, one or more parameters for Dynamic Frequency Selection (DFS) identify the channels which are prohibited from active probing.

Other exemplary embodiments of the wireless apparatus may execute software adapted to perform one or more authorizer functions (see e.g., step 208 of FIG. 2). During execution of the authorizing software application, the wireless apparatus determines from user input, whether or not to authorize an enrollee. Accordingly, the wireless apparatus may additionally comprise a user interface to facilitate this functionality. Such user interfaces may include without limitation: a keypad, touch screen, LCD display, backlight, speaker, and/or microphone (optionally with speech recognition capability). In one illustrative example, a smartphone (e.g., iPhone) may display a user dialog via a display unit thereon, and provide a touch screen input "button" for the user's response.

In another exemplary embodiment, the wireless apparatus software application is adapted to perform one or more registrar functions. In one such implementation, a registrar maintains a centralized database of the devices which are currently registered and addressed within the protected wireless network. Such a wireless apparatus may additionally require one or more memory apparatus and interfaces for database operations. Furthermore, such a wireless apparatus may additionally comprise a secondary interface (wired or wireless), which connects to a comprehensive external database. For example, large scale networks (e.g., cellular, cable, etc.) commonly implement localized and remote databases.

The wireless device may additionally comprise one or more subsections specifically adapted for authentication (see FIG. 2, step 208A). In one embodiment, such authentication may be carried out in software. Alternately, in other implementations, a dedicated hardware authentication engine or other security apparatus (e.g., security processor) may be used.

While the foregoing apparatus architectures are discussed with respect to the illustrated embodiment of FIG. 14, in some embodiments various portions may be obviated or otherwise merged with another component (e.g. multi-mode or single-chip solutions), as would be readily appreciated by one of ordinary skill in the art given the present disclosure.

Methods of Doing Business

In another aspect of the invention, exemplary methods of doing business relating to the foregoing wireless network management capabilities are disclosed.

In one embodiment, the wireless network management capabilities enabled by the invention can be marketed and leveraged. For example, a device manufacturer or service provider can differentiate their product or service over others based on the ease of use, flexibility of connectivity, and general robustness. In certain applications, (such as home networking), the flexibility of the system to dynamically add and subtract network elements of varying qualities and characteristics can also be used as a basis of differentiation or to support a higher product or service price. By giving consumers the ability to control their wireless LAN without having to necessarily understand the security and networking concepts, the customer will ostensibly be willing to pay more either in terms of initial price or subscription fees. Such devices are tangibly better from the consumer or end-user's perspective, since they merely need to power on the device; management may be simply performed on any device already connected on the LAN. The system of the present invention is presented to the user in one simple and coherent interface.

In one example, a home user may easily set up or reconfigure a home office (e.g., speakers, printers, etc.), simply by adding more elements as he or she sees fit. Furthermore, the overall user experience is qualitatively better, as the new technology transparently "works" out of the box, as opposed to requiring extensive and potentially difficult reconfiguration, and/or consultation with online or service call experts. For example, the home user buys a speaker, and plugs it in. The user sees a notification immediately displayed on their laptop. The user clicks on the notification, and music begins playing.

In another example, the home user is listening to music on his personal media device (e.g., iPod Touch). He walks into his house; whereupon a discreet icon appears on his device. He taps the icon with his finger, and his music is played via a Wi-Fi enabled audio device (e.g., AirPort Express) in the living room streamed from his media device.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for discovering a wireless network, the method comprising:
   actively scanning one or more allowed channels by transmitting one or more requests and receiving at least one response message that comprises:
      a first flag that identifies support for a network security program that reduces the number of steps required to setup a protected wireless network (WPS);
      a second flag that identifies support for a security protocol that enables solicited access for WPS (SAW); and
      a third flag that indicates whether an access point that issued the response is currently accepting SAW requests;
   passively scanning one or more prohibited channels by listening for transmitted signals that include at least one flag that is set in a SAW-specific information element in the response message to indicate support for the protocol for SAW;
   discovering a wireless network whose access point is configured to support SAW based on at least one of the active or passive scans; and
   transmitting a request to connect to the access point, wherein the request includes in-band configuration data, thereby causing the access point to start accepting SAW requests;
   actively and passively scanning for the access point to determine whether the access point is currently accepting SAW requests;
   if the access point is currently accepting SAW requests, joining the wireless network.

2. The method of claim 1, wherein the wireless network comprises a network compliant with IEEE Std. 802.11, the one or more requests comprise probe requests, and the transmitted signals comprise beacon signals.

3. The method of claim 2, wherein the passive scanning comprises, scanning a first frequency range subset corresponding to one or more Dynamic Frequency Scan (DFS) prohibited channels.

4. The method of claim 2, wherein the active scanning comprise transmitting the requests over one or more Dynamic Frequency Scan (DFS) allowed channels.

5. An apparatus for use in a wireless network, the apparatus comprising:
   one or more processing units capable of executing one or more computer executable instructions;
   a wireless transceiver; and
   a memory storing a computer program executable by the processor, wherein the apparatus, when the computer program is executed by the one or more processing units:
      actively scans for one or more wireless access points via the wireless transceiver;
      receives at least one response message that comprises:
         a first flag that identifies support for a network security program that reduces the number of steps required to setup a protected wireless network (WPS);
         a second flag that identifies support for a security protocol that enables solicited access for WPS (SAW);
         a third flag that indicates whether an access point that issued the response is currently accepting SAW requests;
      passively scans for the one or more wireless access points via the wireless transceiver by listening for transmitted signals that include at least one flag that is set in a SAW-specific information element in the response message to indicate support for the protocol for SAW;
      determines, based on the parameter, whether one or more discovered wireless access points support the protocol for SAW; and
      transmits a request to connect to the access point, wherein the request includes in-band configuration data, thereby causing the access point to start accepting SAW requests;
      actively and passively scanning for the access point to determine whether the access point is currently accepting SAW requests;
      if the access point is currently accepting SAW requests, joining the wireless network.

6. The apparatus of claim 5, where the apparatus is compliant with IEEE Std. 802.11, the active scan comprises transmitting one or more probe requests, and the passive scan comprises receiving one or more beacon signals.

7. The apparatus of claim 5, wherein the passive scan comprises scanning one or more radio frequency channels that are prohibited for transmission, and the active scan comprises transmitting request messages over one or more channels that are not prohibited for transmission.

8. The apparatus of claim 7, wherein the passive scan and the active scan are performed simultaneously.

9. The apparatus of claim 7, wherein the passive scan and the active scan are performed in a staggered fashion.

10. The apparatus of claim 5, wherein the one or more IEs are embedded within respective ones of management frames in Type-Length-Value (TLV) definitions.

11. The apparatus of claim 5, wherein the apparatus comprises no graphical user interface and wherein the protocol for SAW is configured to allow automatic connection of the apparatus to the wireless network.

12. The apparatus of claim 5, wherein the apparatus comprises a portable media-capable device.

13. A method of forming a wireless network comprised of at least two wireless devices, the method comprising:
    performing a detection protocol using a first of the wireless devices to detect available others of the wireless devices;
    determining based at least in part on the detection protocol whether individual ones of the other wireless devices support the protocol for solicited access to a wireless network (SAW), wherein an individual ones of the other wireless devices is determined to support the protocol for SAW when a response message received from the wireless device comprises:
        a first flag that identifies support for a network security program that reduces the number of steps required to setup a protected wireless network (WPS);
        a second flag that identifies support for a security protocol that enables solicited access for WPS (SAW); and
        a third flag that indicates whether an access point that issued the response is currently accepting SAW requests;
    requesting connection of the first wireless device to the wireless network where the protocol for SAW is supported;
    providing information regarding the first wireless device to at least one of the other devices pursuant to the request, wherein the information includes in-band configuration data; and
    establishing operation between the first wireless device and the at least one other wireless device according to the protocol for SAW.

14. The method of claim 13, wherein the first wireless device comprises a client device, and the at least one other wireless device comprises an access point.

15. The method of claim 14, wherein the first wireless device and the access point are compliant with IEEE Std. 802.11.

16. The method of claim 13, wherein the first wireless device comprises an access point, and the at least one other wireless device comprises a client device.

17. The method of claim 13, wherein the performing a detection protocol using a first of the wireless devices to detect available others of the wireless devices comprises:
    actively scanning one or more allowed channels by transmitting one or more requests; and
    passively scanning one or more prohibited channels by listening for transmitted signals.

18. The method of claim 13, wherein the determining based at least in part on the detection protocol whether individual ones of the other wireless devices support the protocol for SAW comprises receiving an information element as part of a probe response message.

19. The method of claim 13, wherein the in-band configuration data comprises providing a human-assigned, human-readable name or identifier.

20. The method of claim 13, wherein the method is performed without user intervention.

21. The method of claim 13, wherein at least one of the first wireless device or the at least one other wireless device has no graphical user interface, and the method comprises using another wireless device of the wireless network to provide graphical user interface capabilities for the first or at least one other device.

22. A non-transitory computer readable medium storing at least one computer program, the at least one computer program having a plurality of instructions executable by a computer to perform the following:
    perform a detection protocol using a first wireless device to detect one or more available wireless devices;
    determine, based at least in part on the detection protocol, whether individual ones of the one or more available wireless devices support a protocol for solicited access to a wireless network (SAW), wherein an individual one of the available wireless devices is determined to support the protocol for SAW when a response message received from the wireless device comprises:
        a first flag that identifies support for a network security program that reduces the number of steps required to setup a protected wireless network (WPS);
        a second flag that identifies support for a security protocol that enables solicited access for WPS (SAW); and
        a third flag that indicates whether an access point that issued the response is currently accepting SAW requests;
    request connection of the first wireless device to the one or more available wireless devices where the protocol for SAW is supported;
    provide in-band configuration data regarding the first wireless device to at least one of the one or more available wireless devices pursuant to the request; and
    establish operation between the first wireless device and the at least one available wireless device.

* * * * *